US008342680B2

(12) United States Patent
Wada

(10) Patent No.: US 8,342,680 B2
(45) Date of Patent: Jan. 1, 2013

(54) EYEGLASS LENS

(75) Inventor: Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 256 days.

(21) Appl. No.: 12/881,015

(22) Filed: Sep. 13, 2010

(65) Prior Publication Data

US 2011/0085127 A1  Apr. 14, 2011

(30) Foreign Application Priority Data

Oct. 8, 2009   (JP) ................................. 2009-234079

(51) Int. Cl.
*G02C 7/16*   (2006.01)
(52) U.S. Cl. ........................................................ 351/45
(58) Field of Classification Search ................... 351/45, 351/46, 49, 159, 163, 41
See application file for complete search history.

(56) References Cited

U.S. PATENT DOCUMENTS

| | | | |
|---|---|---|---|
| 1,469,931 A * | 10/1923 | Davison ........................ 359/738 |
| 2,065,502 A | 12/1936 | Bausch | |
| 4,338,003 A | 7/1982 | Adrian | |
| 7,328,998 B2 | 2/2008 | Hobbs | |
| 7,572,513 B2 | 8/2009 | Katsukake et al. ............ 428/446 |
| 2006/0078723 A1 | 4/2006 | Katsukake et al. ......... 428/304.4 |
| 2007/0285613 A1 | 12/2007 | Hobbs | |

FOREIGN PATENT DOCUMENTS

| | | |
|---|---|---|
| FR | 2908899 A1 | 5/2008 |
| JP | 10-082975 | 3/1998 |
| JP | 2001-327908 | 11/2001 |
| JP | 2006-139247 | 6/2006 |
| WO | 9735215 A1 | 9/1997 |
| WO | 2007142794 A1 | 12/2007 |
| WO | 2008059177 A1 | 5/2008 |

OTHER PUBLICATIONS

Extended European search report dated Dec. 14, 2010 for corresponding European application 10186520.2 lists the reference above.
European office action dated Apr. 2, 2012 issued in corresponding European application 10186520.2.

* cited by examiner

*Primary Examiner* — Hung Dang
(74) *Attorney, Agent, or Firm* — DLA Piper LLP (US)

(57) ABSTRACT

A lens that covers the front side of an eye, includes: a high light-transmissive region including an eyepoint; and a low light-transmissive region surrounding the entire circumference of the high light-transmissive region, a light blocking ratio in the low light-transmissive region being higher than the light blocking ratio in the high light-transmissive region, wherein the low light-transmissive region has a region where the light blocking ratio changes toward the periphery.

11 Claims, 17 Drawing Sheets

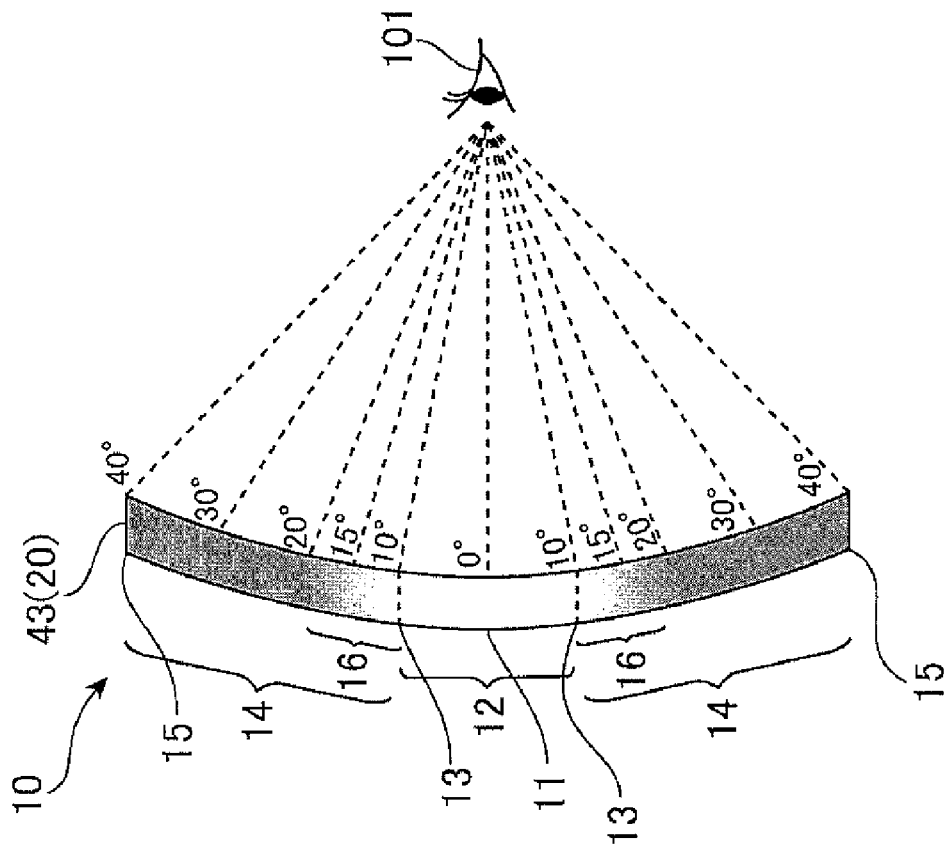
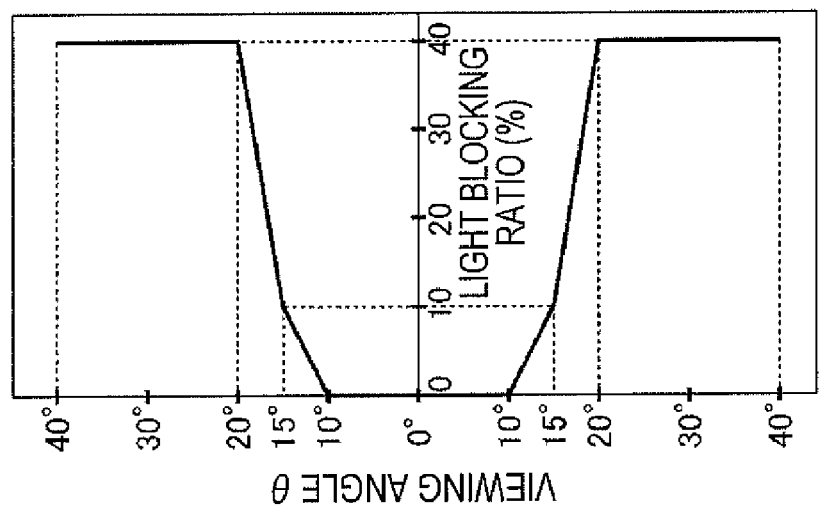
FIG. 5

EYEGLASS LENS

BACKGROUND

1. Technical Field

The present invention relates to an eyeglass lens.

2. Related Art

JP-A-10-82975 (Abstract, Section [0009]) describes an eyeglass lens designed in such a way that a central portion thereof has higher light transmittance and a peripheral portion thereof has lower light transmittance. To this end, a mirror coating that forms a half-silvered mirror is provided on the front surface of the lens, and a plate having a through hole is attached to the rear surface of the lens. In the eyeglasses described in JP-A-10-82975, since each of the eyeglass lenses has high light transmittance at the central portion thereof, the wearer can see objects relatively clearly through the central portion of each of the lenses that has high transmittance, whereas the low-transmittance peripheral portion of the lens can reduce the amount of light incident on the eye. The reduction is effective in protecting the eye from light and, when the eye suffers from the cataract, the low-transmittance peripheral portion of the lens reduces irregular reflection of light in a peripheral portion of the crystalline lens of the eye so that the wearer can see an object more clearly.

Eyeglasses including sunglasses are required to correct vision and protect eyeballs and/or recently show value as a clothing ornament or a decoration of the wearer. That is, eyeglasses, even when they excel in functionality, are simply a tool that enhances a physical function but are not accepted to be useable for the user for daily use unless the eyeglasses are recognized to have value as a clothing ornament, for example, to be fashionable or decorative.

Further, if eyeglasses are simply a tool that can be used to ease a specific functional disorder and are not hence useable for users who do not suffer from the functional disorder, the eyeglasses are less marketable and hence of high cost, simply offering a tool difficult for users who need the tool to purchase.

SUMMARY

An aspect of the invention is directed to a lens that covers the front side of an eye, the lens including a high light-transmissive region including an eyepoint (position of the eye when eyeglasses are worn, center position of pupil, fitting point) and a low light-transmissive region surrounding the entire circumference of the high light-transmissive region. A light blocking ratio in the low light-transmissive region is higher than the light blocking ratio in the high light-transmissive region, and the low light-transmissive region of the lens has a region where the light blocking ratio changes toward the periphery.

The lens has a region (gradient region) which surrounds the entire circumference of the high light-transmissive region and where the light blocking ratio changes toward the periphery, whereby a lens which has a highly fashionable, novel exterior appearance and whose light blocking ratio changes along concentric donut or annular shapes can be provided. That is, the lens described above, whose light blocking ratio can be changed by changing the density (shading) of the color, changing the reflectance (transmittance), changing the open area ratio, for example, by using a fine pattern, or any other externally visible change of the lens and the color or any one of the other parameters changes along concentric donut or annular shapes, is recognized as a highly fashionable lens with novel decoration. Further, the lens has the high light-transmissive region and the low light-transmissive region surrounding the entire circumference of the high light-transmissive region and having the gradient region. Therefore, eyeglasses including the lenses can be worn not only by users who suffer from the cataract or other ocular diseases and hence desire functional enhancement by using glasses having the low light-transmissive region surrounding the entire circumference of the high light-transmissive region but also by typical users as a decoration.

Further, the lens has the low light-transmissive region surrounding the entire circumference of the high light-transmissive region and further has the region where the light blocking ratio changes toward the periphery. The wearer can therefore view an outside object not only through the high light-transmissive region but also through the region where the light blocking ratio changes toward the periphery of the low light-transmissive region, whereby the viewing angle will not be significantly narrowed in comparison with the area of the lens. Further, the viewing angle ensured in comparison with the area of the lens can be controlled by controlling the size of the region where the light blocking ratio changes toward the periphery and/or how sharply the light blocking ratio is changed. The lens is therefore useful for users who desire vision correction and eyeball protection and typical users who simply use the lens as a decoration. The lens hence has a number of freedoms and provides a high level of safety. It is therefore possible to provide a universally designed lens having the low light-transmissive region surrounding the entire circumference of the high light-transmissive region so that the amount of light incident on the eye is reduced and hence the eye is effectively protected.

A typical example which is located in the low light-transmissive region and where the light blocking ratio changes toward the periphery is a region where the light blocking ratio increases toward the periphery. Since the boundary between the high light-transmissive region and the low light-transmissive region can be made blurred, a highly fashionable lens can be provided. Further, the wearer will not have any strange feeling that may occur when there is a clear boundary between the high light-transmissive region and the low light-transmissive region. Therefore, a lens that can be used more casually by typical users and users who suffer from disorders can be provided.

In the lens described above, the high light-transmissive region desirably has a region where the viewing angle is at least 10 degrees and the total light blocking ratio ranges from 0 to 95%. A region where no head movement is involved in discriminating observation (eyeball moving region in discriminating observation) is generally assumed to be a region where the viewing angle is approximately 10 degrees, and the region is provided as the high light-transmissive region, which is brighter than the low light-transmissive region, whereby a lens further suitable for universal use, for example, causing less strange feeling when used by a user and less difference in usage, can be provided.

In the lens described above, the high light-transmissive region desirably has a region where the viewing angle is smaller than 20 degrees and the total light blocking ratio ranges from 0 to 95%. Since glare light at a viewing angle greater than 20 degrees is soft glare light (blinding glare light, disability glare light), it is not essential to prevent the glare light from entering the eyes, unlike glare light leading to discomfort (discomfort glare light) in a region where the viewing angle is small. Decrease in work efficiency can be suppressed by reducing the amount of soft glare light. It is therefore desirable to limit the high light-transmissive region to a viewing angle of 20 degrees and set a region where the viewing angle is greater than 20 degrees as the low light-transmissive region so that glare light that tends to degrade working environments will not enter the eyes.

In the lens described above, the low light-transmissive region desirably includes a first low light-transmissive region and a second low light-transmissive region surrounding the entire circumference of the first low light-transmissive region. Desirably, the light blocking ratio in the second light-transmissive region is higher than the light blocking ratio in the first low light-transmissive region. Since the low light-transmissive region for preventing blinding glare light from entering the eyes is divided into a plurality of regions, the first region where a priority is placed on what is called free observation in which a target to be viewed (object) is roughly recognized and the second region where a priority is placed on blocking glare light, the influence of glare light can be suppressed and the contrast sensitivity (quality representing how well an object is viewed, visual quality) can further be improved. The first low light-transmissive region desirably has a region where the viewing angle is smaller than 30 degrees and the total light blocking ratio ranges from 0 to 95%. Further, providing a plurality of regions having different light blocking ratios allows the color or the reflectance of the lens to be changed in the low light-transmissive region, whereby a lens having increased fashionable value and decorative value can be provided.

In the lens described above, the low light-transmissive region desirably has a region where the light blocking ratio for near-infrared light, that is, light having wavelengths ranging from 760 to 1300 nm is high. For users who suffer from retinal diseases and choroidal diseases, the discrimination ability can be improved and decrease in work efficiency can be suppressed particularly by suppressing the glare light in the frequency band described above.

In the lens described above, the low light-transmissive region effectively has a region where the light blocking ratio for near-ultraviolet light, that is, light having wavelengths ranging from 310 to 400 nm is high. For users who suffer from the keratitis, the cataract, the glaucoma, and other ocular diseases, the discrimination ability can be improved and decrease in work efficiency can be suppressed particularly by suppressing the glare light in the frequency band described above. Suppressing near-infrared light and/or near-ultraviolet light while ensuring the field of view is effective in preventing the ocular disorders described above, and the lens of the aspect of the invention is also effective for users who do not suffer from the disorders described above.

The lens of the aspect of the invention may be a progressive-power lens further having a distance region for viewing a relatively distant point, a near region for viewing a relatively near point, and a region which is located between the distance region and the near region and whose power continuously changes. In the progressive-power lens, the eyepoint in the center of the high light-transmissive region is desirably the center of the distance region. Lowering the influence of blinding glare light in the distance region likely leads to improvement in discrimination ability. Further, a highly fashionable progressive-power lens whose power continuously changes and whose eyepoint is the distance center of the progressive-power lens can be provided.

In the lens described above, the low light-transmissive region may include at least part of the lens and the part is colored. Coloring is one method for increasing the light blocking ratio in the low light-transmissive region, and a more fashionable and decorative lens can be provided by changing the color of the lens on a lens basis or introducing multiple colors in the lens in correspondence with the levels of the light blocking ratio.

The lens of the aspect of the invention may have a light control layer formed on one side of the lens and a light blocking layer formed on the other side of the lens. The light control layer changes (controls) the light blocking ratio in the high light-transmissive region and the light blocking ratio in the low light-transmissive region, and the light blocking layer increases the light blocking ratio in the low light-transmissive region relative to the light blocking ratio in the high light-transmissive region. When the light control layer, which provides the entire lens with light transmission performance including ultraviolet light shielding and infrared light shielding, is formed on the side different from the side on which the light blocking layer, which controls the light blocking ratio in the high light-transmissive region and the light blocking ratio in the low light-transmissive region, is formed, a variety of functions, such as color change and polarization, can be imparted to the lens in which the low light-transmissive region is formed around the high light-transmissive region. A multi-functional lens can thus be provided.

Another aspect of the invention is directed to eyeglasses including eyeglass lenses, each of which is the lens described above and an eyeglass frame to which the eyeglass lenses are attached. Eyeglasses capable of efficiently shielding blinding glare light, having high fashionable and decorative value, and readily used by a user for daily use can be provided. Having high fashionable value, the eyeglasses not only can be used to ease a specific functional disorder but also can be used by a variety of users. Therefore, the eyeglasses have high marketability and hence can be supplied to users who suffer from functional disorders at low cost.

BRIEF DESCRIPTION OF THE DRAWINGS

The invention will be described with reference to the accompanying drawings, wherein like numbers refererence like elements.

FIG. 5 shows the distribution of a light blocking ratio of a light blocking layer shown in FIG. 4.

DESCRIPTION OF EXEMPLARY EMBODIMENTS

1. First Embodiment 1.1 Summary of Eyeglass Lens

Figure 1:
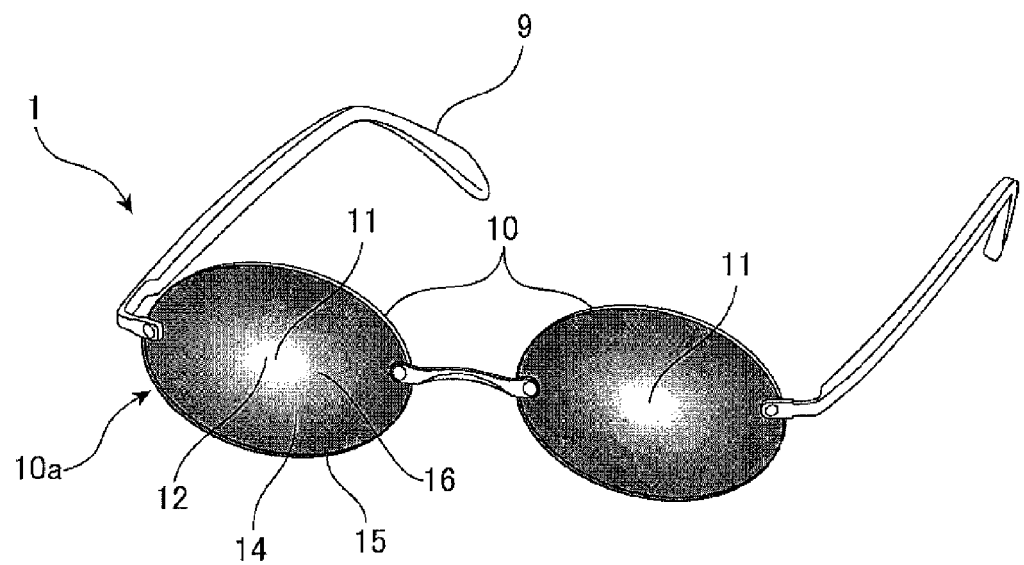
FIG. 1 is a perspective view of eyeglasses including eyeglass lenses viewed from the object side.
Figure 2:
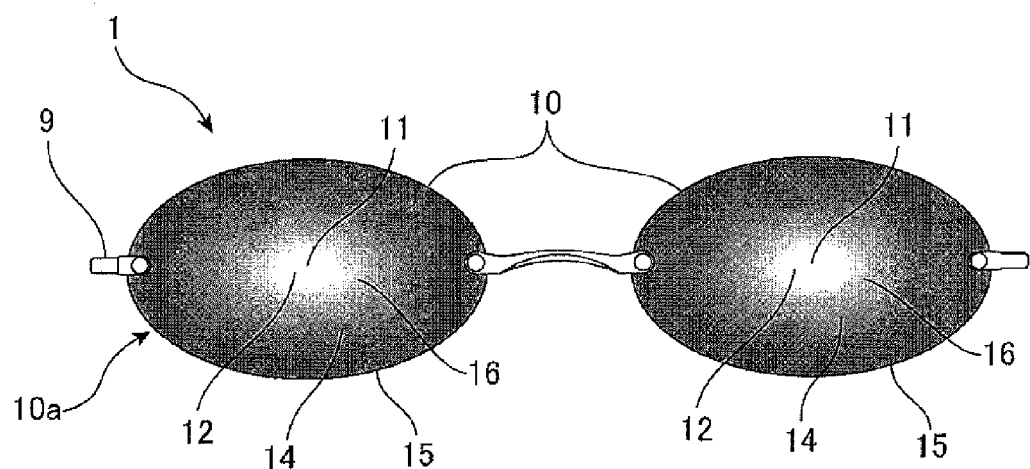
FIG. 2 is a front view of the eyeglasses including the eyeglass lenses viewed from the object side.

FIG. 1 is a perspective view of eyeglasses 1 including eyeglass lenses 10 according to an embodiment of the invention viewed from the object side. FIG. 2 is a front view of the eyeglasses 1 including the eyeglass lenses 10 according to the embodiment of the invention viewed from the object side. The eyeglasses 1 include a set of right and left eyeglass lenses 10, each of which has an elliptical shape when viewed from the front, and an eyeglass frame 9 to which the eyeglass lenses 10 are attached. Each of the eyeglass lenses 10 has a high light-transmissive region 12 including an eyepoint (position of the eye when eyeglasses are worn, center position of pupil, fitting point) 11 and a low light-transmissive region 14 surrounding the entire circumference of the high light-transmissive region 12. The low light-transmissive region 14 has a region (gradient region, gradation region) 16 where a light blocking ratio is higher than in the high light-transmissive region 12 and the light blocking ratio increases toward the periphery 15. In each of the eyeglass lenses 10, the gradient region 16 extends from a central portion (high light-transmissive region) 12 of the lens to a peripheral portion (low light-transmissive region) 14 of the lens and is formed by gradually increasing the density (shading) of the color of the rear side (eyeball side) 10b of the eyeglass lens 10.

Figure 3:
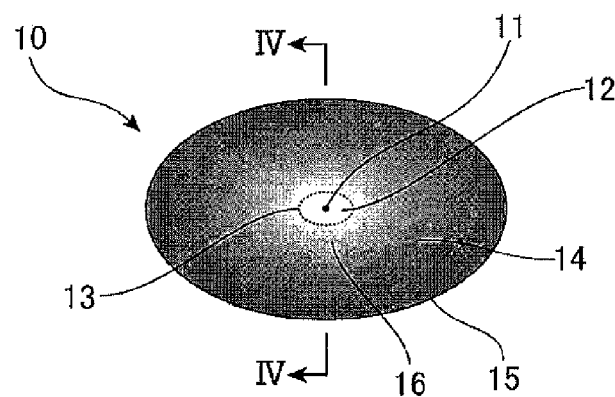
FIG. 3 is a front view of one of the eyeglass lenses viewed from the object side.
Figure 4:
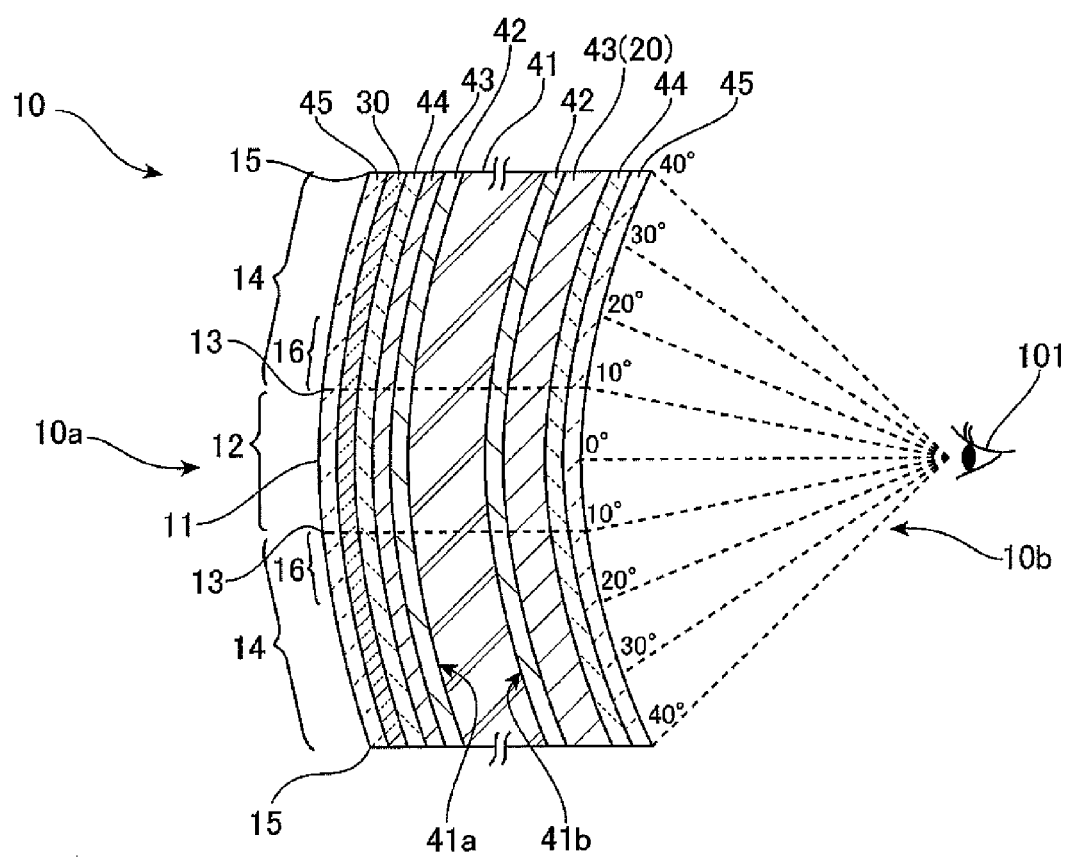
FIG. 4 is a cross-sectional view of the eyeglass lens shown in FIG. 3 taken along the line IV-IV.

FIG. 3 is a front view of one of the eyeglass lenses 10 extracted from the eyeglasses 1 and viewed from the object side. FIG. 4 is a cross-sectional view of a schematic configuration of the eyeglass lens 10 (cross section taken along the line IV-IV in FIG. 3). The broken line in FIG. 3 represents, for description purposes, the boundary 13 between the high light-transmissive region 12 including the eyepoint 11 in the eyeglass lens 10 and the low light-transmissive region surrounding the entire circumference of the high light-transmissive region 12. In this example, the gradient region 16, where the light blocking ratio increases toward the periphery 15, is adjacent to the boundary 13. The light blocking ratio therefore smoothly changes at the boundary 13 between the high light-transmissive region 12 and the low light-transmissive region 14, and the boundary 13 indicated by the broken line is hardly recognized or is not very visible to those who externally look at the eyeglasses 1 worn by the user or the user who wears the eyeglasses 1.

Further, the gradient area 16 provided in the eyeglass lens 10 has a donut or ring shape in which the density (shading) of the color of the lens gradually increases from the high light-transmissive region 12 toward the low light-transmissive region 14, which makes the eyeglass lens novel. Moreover, since no clear boundary is present between the high light-transmissive region 12 and the low light-transmissive area 14, wearing the eyeglasses provides a glare shielding effect, which will be described later, and does not cause the wearer to feel strange about the field of view. At the same time, the highly fashionable eyeglass lens 10 does not cause typical users and users who suffer from disorders to feel unpleasant for daily use but encourages the user to use it casually. The eyeglass lens 10 is also recognized to have the same exterior appearance shown in FIG. 3 when viewed from the rear side (eyeball side) 10b, as when the eyeglass lens is viewed from the front side (object side) 10a.

The eyeglass lens 10 has a structure in which a light blocking layer 20 where the light blocking ratio changes is provided on the side where a rear surface 41b of a lens base 41, that is, an eyeball 101 is present and a light control layer 30 is provided on the side where a front surface 41a of the lens base 41, that is, an object is present. The light control layer 30 formed on the object side (front side) 10a of the eyeglass lens 10 has a light control capability (photochromic capability) that changes the color when the lens is irradiated with light containing ultraviolet radiation. The light control layer 30 is manufactured by applying a liquid (coating liquid) having a light control capability. The coating liquid may, for example, contain a photochromic compound, a radically polymerizable monomer, and an amine compound, the radically polymerizable monomer having a silanol group or a group that produces a silanol group in a hydrolysis process. The light control layer 30 changes (controls) both the light blocking ratio in the high light-transmissive region 12 and the light blocking ratio in the low light-transmissive region 14 of the eyeglass lens 10. As an example of the light control layer 30, the light blocking ratio changes in accordance with the intensity of the ultraviolet light in such a way that visible light (460 to 600 nm, preferably 400 to 760 nm) is attenuated by 0 to 50% and near-ultraviolet light (310 to 400 nm) is attenuated by 0 to 90%, more preferably 0 to 100%.

The light blocking layer 20, where the light blocking ratio changes, on the rear side (the side where the eyeball 101 is present) 10b of the eyeglass lens 10 is formed by changing the coloring density of a colorable hard-coat layer 43. The light blocking layer 20 forms the high light-transmissive region 12 and the low light-transmissive region 14, which has the gradient region 16 where the light blocking ratio is higher than in the high light-transmissive region 12.

FIG. 5 shows the hard-coat layer 43 (light blocking layer 20) extracted from the eyeglass lens 10 and how the hard-coat layer 43 is colored as a function of a viewing angle θ. Specifically, the hard-coat layer 43 is not colored in the range where the viewing angle θ (which will be described later) ranges from 0 to 10 degrees, and the non-colored portion forms a region where the light blocking ability is not controlled in the hard-coat layer 43 (light blocking ratio is 0%).

The hard-coat layer 43 is colored in the range where the viewing angle θ ranges from 10 to 15 degrees in such a way that the light blocking ratio gradually changes from 0 to 10% substantially in proportion to the viewing angle θ. The hard-coat layer 43 is colored in the range where the viewing angle θ ranges from 15 to 20 degrees in such a way that the light blocking ratio gradually changes from 10 to 40% substantially in proportion to the viewing angle θ. The hard-coat layer 43 is colored in the range where the viewing angle θ is 20 degrees or greater in such a way that the light blocking ratio is fixed to 40%. Therefore, the range where the viewing angle θ is 10 degrees or smaller can be the high light-transmissive region 12; the range where the viewing angle θ is greater than 10 degrees can be the low light-transmissive region 14; and the range where the viewing angle θ ranges from 10 to 20 degrees can be the gradient region 16. Alternatively, since the field of view in the nighttime is not substantially narrowed when the light blocking ratio is approximately 10% or lower, the definition described above may be changed as follows: The range where the viewing angle θ is 15 degrees or smaller is the high light-transmissive region 12; the range where the viewing angle θ is greater than 15 degrees is the low light-transmissive region 14; and the range where the viewing angle θ ranges from 15 to 20 degrees is the gradient region 16 in the low light-transmissive region 14. Zero percent of light blocking ratio used herein means that no light blocking ratio enhancement is made by coloring or any other suitable technique. It is, however, noted that light absorption in the lens base 41 and other layers 42 to 45 is not taken into consideration. Light absorption (attenuation) may therefore occur in the eyeglass lens 10 in some cases even if the light blocking ratio is herein described to be 0%.

That is, the eyeglass lens 10 has a primer layer 42, the hard-coat layer 43, an anti-reflection layer 44, and an anti-fouling layer 45 stacked in this order on the rear surface 41*b* of the lens base 41. The hard-coat layer 43 forms a colored layer (light blocking layer) 20 and controls the light blocking ratio as a function of the location in the eyeglass lens 10. On the front surface 41*a* of the lens base 41 are stacked another primer layer 42, hard-coat layer 43, anti-reflection layer 44, the light control layer 30 and antifouling layer 45 in this order, and the light control layer 30 controls the light blocking ratio in accordance with the time when the eyeglasses are used or as a function of the location in the eyeglasses. It is alternatively possible to provide the colored layer 20 on the front side 10*a* and the light control layer 30 on the rear side 10*b*. However, to allow the light control layer 30 to change its color quickly in response to ultraviolet light, the light control layer 30 is desirably provided on the front side 10*a*, where the light control layer 30 is more likely exposed to ultraviolet light than in a case where the light control layer 30 is provided on the rear side 10*b*, where ultraviolet light is likely absorbed by the lens base 41 or other layers. A method for manufacturing the eyeglass lens 10 will be further described later.

Figure 6:
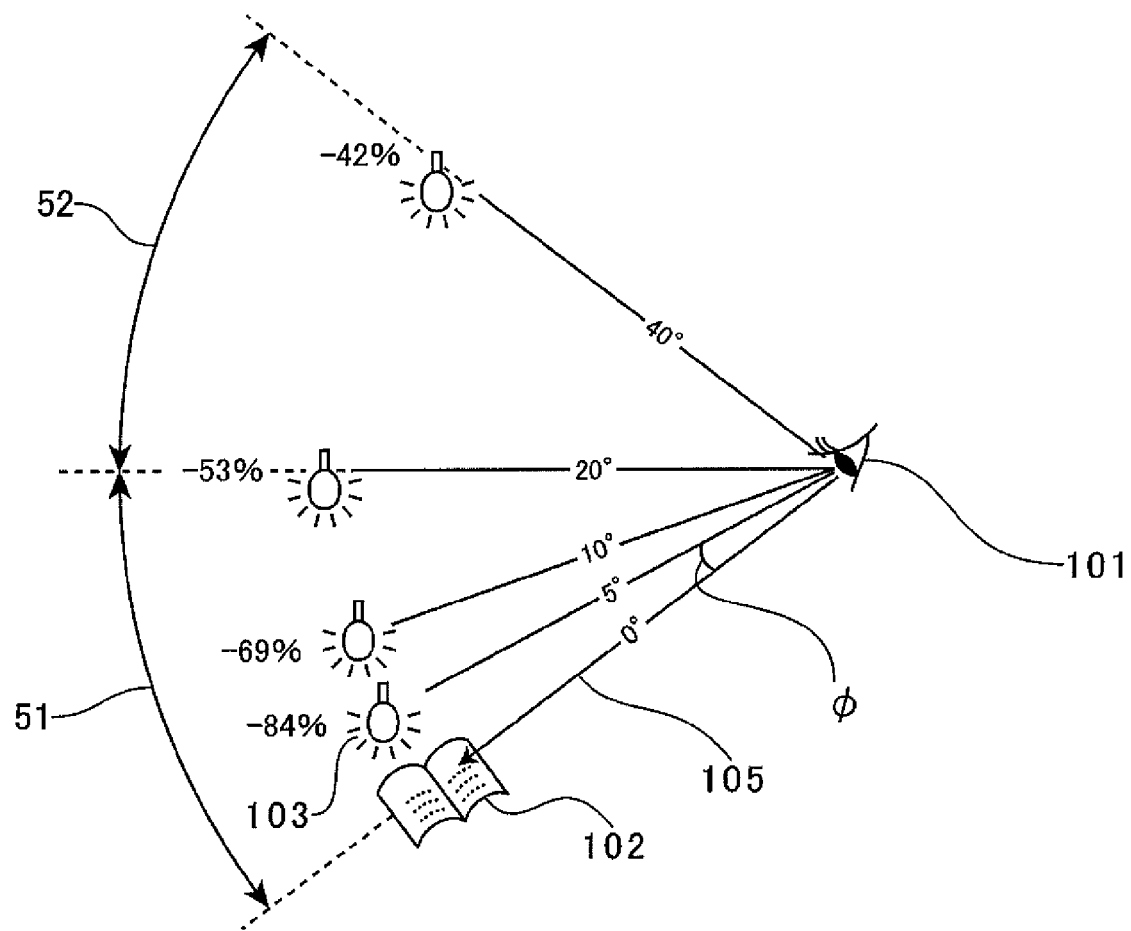
FIG. 6 shows glare versus a viewing angle.
Figure 7:
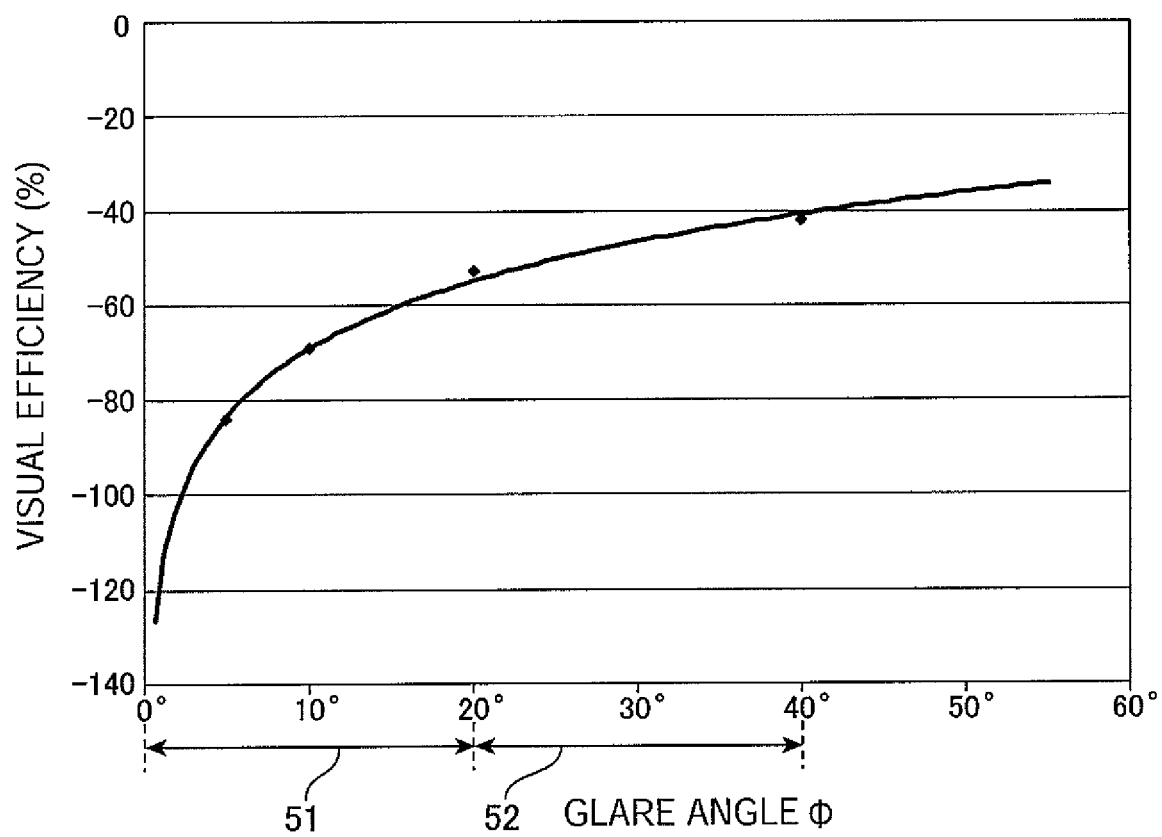
FIG. 7 shows a visual efficiency versus a glare angle.
Figure 8:
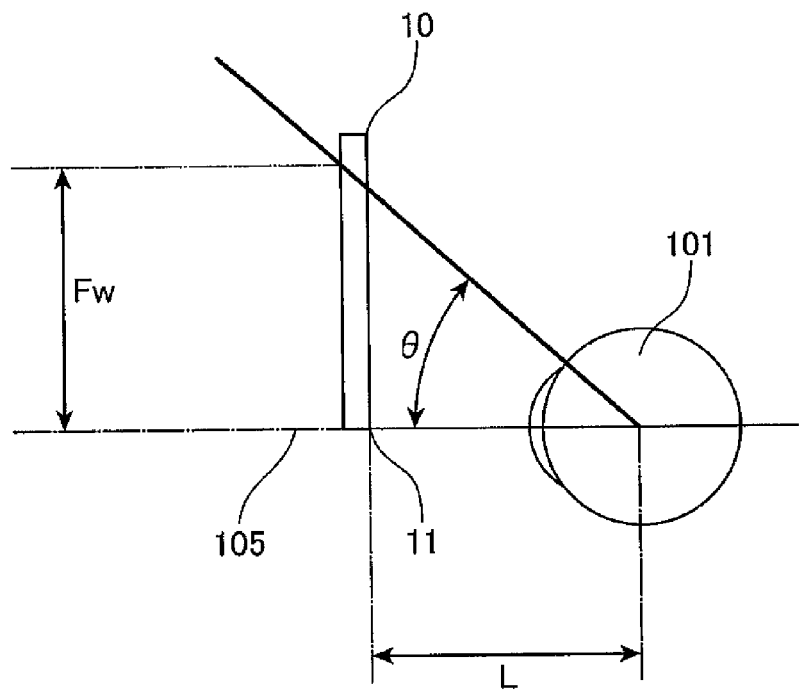
FIG. 8 shows how to determine the viewing angle.

1.2 Glare Shielding Effect of Eyeglass Lens having High Light-Transmittance Region and Low Light-Transmittance Region FIG. 6 shows glare versus the viewing angle, and FIG. 7 shows the glare angle versus a visual efficiency (visibility). FIG. 8 shows how to determine the viewing angle. As shown in FIG. 8, the viewing angle θ with respect to a visual axis 105 of the eyeball 101 is determined by the following equation (1):

$$\theta = \tan^{-1}(Fw/L) \quad (1)$$

where L represents an eyeglass fitting distance, and Fw represents the width of the field of view.

The width of the field of view Fw represents the distance from the eyepoint 11 of the eyeglass lens 10. The eyeglass lens 10 shown in FIGS. 1 to 3 is designed based on a concentric or elliptical pattern (the intersection of the minor and major axes of an ellipse is the eyepoint 11 or the vicinity thereof) around the eyepoint 11 or a pattern radially changing from the eyepoint 11 toward the periphery 15. The design of the eyeglass lens 10 is therefore primarily determined by the distance from the eyepoint 11. The eyeglass fitting distance L is, however, substantially fixed to approximately 25 mm. The viewing angle θ can therefore define the design of the eyeglass lens 10. For example, 4 mm of width of the field of view Fw corresponds to approximately 9 degrees of viewing angle θ. The following description will therefore be made of the relationship between the design of the eyeglass lens 10 described above and glare shielding as a function of the viewing angle θ. It is noted in the following description that the viewing angle θ means an absolute value or a semi-apex angle of a cone unless otherwise specified and corresponds to a solid angle. The viewing angle θ therefore means inclination to the visual axis 105 by ±θ in the horizontal and vertical directions.

FIG. 6 shows that the visibility of an object 102 lowers when strong light (light source) 103 is present at a certain angle (glare angle) φ with respect to a line of fixation (the line corresponding to zero degrees in FIG. 6, visual axis). In FIG. 6, decrease in visibility is expressed in terms of decrease in illuminance. FIG. 7 shows the decrease in visibility (decrease in illuminance) in terms of decrease in visual efficiency versus the glare angle φ. As shown in FIG. 6, the visual efficiency (visibility) changes with the glare angle φ with respect to a target to be viewed (object) 102, and glare produced by the light source 103 in the field of view reduces visual efficiency. When the distance from the target to be viewed (object) 102 to the light incident on the eyeball 101 in every direction (glare light) increases, the glare gradually decreases and hence the visual efficiency (visibility) increases.

The glare (photophobia) described above leads to discomfort or decrease in visual performance due to excess luminance or excess luminance contrast and is classified into discomfort glare and blinding glare (disability glare).

Decrease in visual efficiency due to glare at a glare angle φ of 20 degrees or smaller substantially exceeds 50%, which is significantly large, and hence the object 102 is hardly identified. The viewer therefore suffers discomfort and almost unintentionally moves the eyeballs 101, moves the head, changes the posture, or do other actions so that the viewer will not receive glare light at least within the range described above (at a glare angle φ of 20 degrees). The glare light in this range is called discomfort glare light 51. "Discomfort glare" leads to a state in which the viewer suffers discomfort when the difference in luminance between portions adjacent to each other within the field of view is significantly large or when the amount of light incident on the eyes sharply increases.

On the other hand, decrease in visual efficiency due to glare light at a glare angle φ ranging from 20 to 40 degrees is approximately 50% or smaller. The glare light within this angular range is therefore mild or soft enough for the viewer not to suffer significant discomfort but still causes the visual efficiency to decrease. The glare light within this angular range is therefore called blinding glare light (disability glare light) 52. It is believed that disability glare light 52 leads to decrease in vision due to decrease in contrast of an image on the retina, decrease in exposure, disability to perform retinal adaptation, and other disorders resulting from scattered light produced in eye tissues. Reflection glare that is produced by light reflected off a printed surface and causes difficulty in reading characters is also one type of disability glare light 52.

To suppress decrease in visual efficiency, it is therefore desirable to not only quickly shift discomfort glare light 51, whatever direction it comes from, at least into the range of disability glare light 52 so that the field of view is ensured but also constantly and efficiently eliminate the influence of disability glare light 52 so that a satisfactory field of view is ensured. Further, shielding disability glare light 52, which otherwise the eyes unintentionally keep receiving, is effective not only in ensuring the field of view but also in preventing in advance disorders of the eyeball, the cornea, and other sites from developing. Moreover, for patients who suffer from the cataract, contrast sensitivity greatly decreases due to glare light because light is scattered in the turbid crystalline lens, and shielding disability glare light 52 is also effective in correcting the vision for users who suffer from the cataract or other similar ocular diseases.

Figure 9:
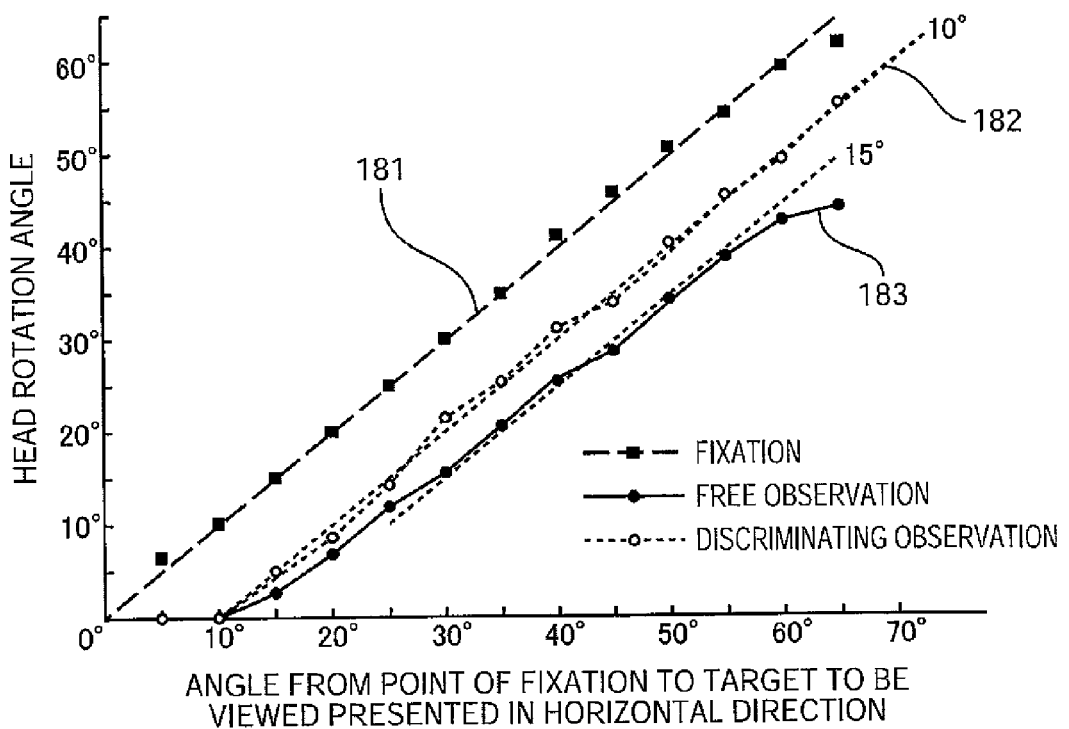
FIG. 9 shows cephalic (ocular) movement at the time of searching a target to be viewed.

FIG. 9 shows an example of observed cephalic (ocular) movement at the time of searching a target to be viewed. The graphs shown in FIG. 9 show how much the head rotates to recognize the target to be viewed (object) having moved from a point of fixation by a certain angle in the horizontal direction. In a fixation state in which the viewer concentrates his/her attention on the target to be viewed (object), the head rotates as the object rotates, as indicated by the graph 181. In contrast, in a discriminating observation state in which the viewer simply recognizes the target to be viewed (object), the movement of the head decreases (is smaller) by approximately 10 degrees relative to the angular movement of the object, as indicated by the graph 182. From the result described above, the angular range within which the object can be recognized by moving the eyeballs can be limited to approximately 10 degrees. The angular range where the viewing angle θ is approximately 10 degrees or smaller can therefore be called a discriminating vision region (a region within which the eyeballs move in the discriminating observation). Further, in a free observation state in which the target to be viewed (object) is roughly recognized, the movement of the head decreases (is smaller) by approximately 15 degrees relative to the angular movement of the object, as indicated by the graph 183. The angular range where the viewing angle θ is approximately 15 degrees or smaller can therefore be called a free vision region (a region within which the eyeballs move in the free observation).

Figure 10:
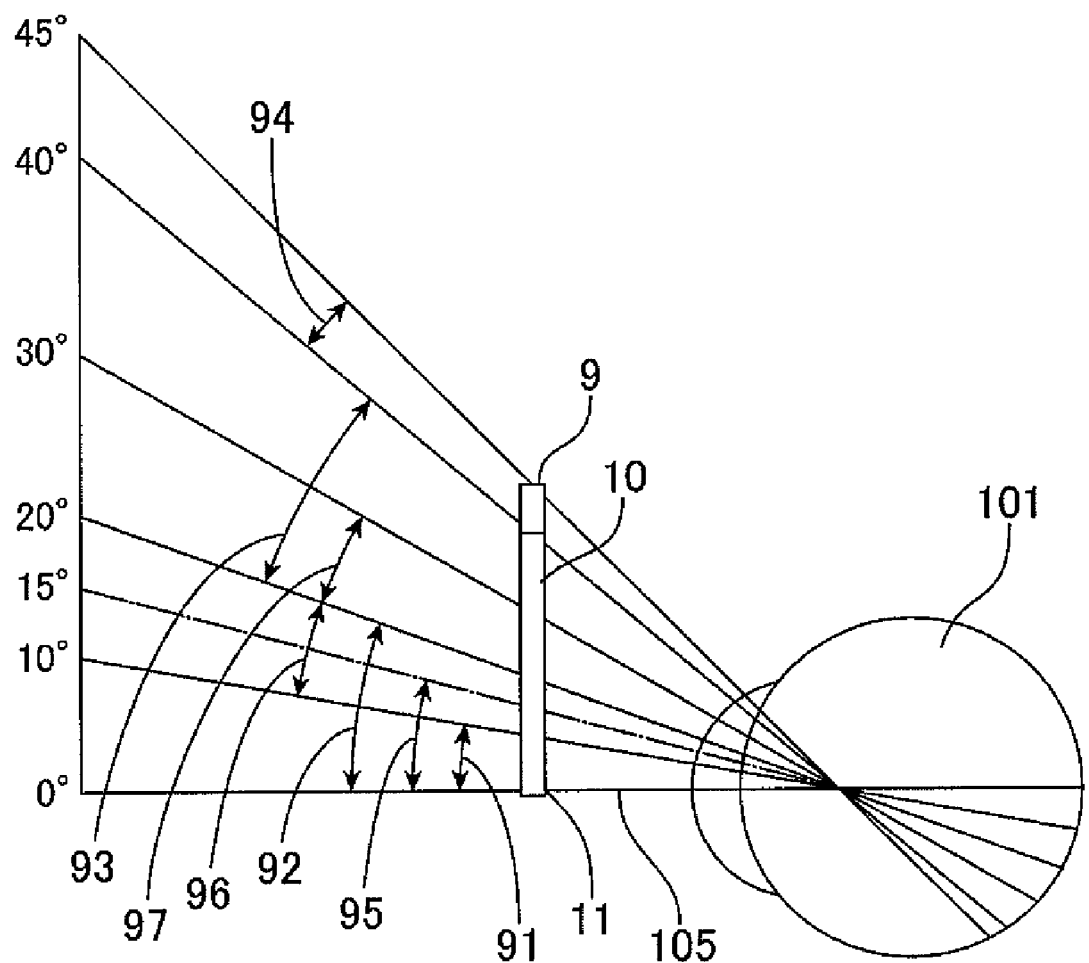
FIG. 10 shows regions of the eyeglass lens.

FIG. 10 shows several regions set in the eyeglass lens 10 by the inventor of the present application based on the above discussion. The range where the viewing angle θ is 10 degrees or smaller with respect to the visual axis 105 of the eyeglass lens 10 can be defined as a discriminating vision region 91. As described above, in the range where the viewing angle θ is 10 degrees or smaller, the eyeballs primarily move for discriminating observation. It is therefore believed that this range desirably provides a clearest possible field of view and providing a clear field of view is more desirable than shielding glare light unless ultraviolet light or other harmful light is significantly strong.

The range where the viewing angle θ is 20 degrees or smaller with respect to the visual axis 105 can be defined as an eyeball moving region 92. The eyeball moving region 92 includes the discriminating vision region 91 and a free vision region 95. Glare light at a glare angle φ of 20 degrees or smaller is the discomfort glare light 51. When glare light is present within the range where the viewing angle θ is 20 degrees or smaller, the viewer is expected to avoid the glare light within this range by moving the eyeballs or the head. In the range where the viewing angle θ is 20 degrees or smaller, it is therefore basically believed that providing a clear field of view is more desirable than shielding or suppressing glare light unless ultraviolet light or other harmful light is significantly strong.

On the other hand, the range where the viewing angle θ ranges from 10 to 20 degrees is beyond the discriminating vision region 91 and less affects the vision than the discriminating vision region 91. Further, the viewing angle θ in the free vision region 95 does not exceed approximately 15 degrees, and it can be said that a region where the viewing angle θ is greater than 15 degrees (can) less contributes to clear grasp of an object even if the object is in the field of view. Therefore, the range where the viewing angle θ ranges from 10 to 20 degrees is an intermediate region 96 where substantially the same priority may be placed on providing a clear field of view and shielding or suppressing glare light or a priority is placed on either of them. That is, in the intermediate region 96 where the viewing angle θ ranges approximately from 10 to 20 degrees, the function of the eyeglass lens 10 can be flexibly set in accordance with the user or the application, and the eyeglass lens 10 can be designed in a highly flexible manner in the intermediate region 96.

The range where the viewing angle θ ranges from 20 to 40 degrees with respect to the visual axis 105 is a glare shielding region 93. Glare light in the region where the glare angle φ is 20 degrees or greater is the blinding glare light 52 as shown in FIGS. 6 and 7, and the viewer may not be able to avoid the glare light in this range by moving the eyeballs or the head. The glare light in this range also leads to decrease in visual efficiency. It is therefore desirable in the glare shielding region 93 to place a high priority on shielding glare light over providing a clear field of view. On the other hand, it has been found that the viewer has sufficient sensitivity to light in the range where the viewing angle θ is 40 degrees and therearound in consideration of the visual sensitivity distribution and the retinal photoreceptor distribution. Further, the level of the sensitivity and the density of the photoreceptors relatively sharply increase in the range where the viewing angle θ is 30 degrees and therearound. In consideration of the fact described above, completely blocking light to be incident on the eyeball 101 in the range where the viewing angle θ ranges from 20 to 40 degrees disadvantageously forces the visual sensitivity in this range to be zero and does not allow the capability of photoreceptors to be used. To make use of the discrimination ability of the eyeball 101, it is desirable to ensure the field of view to some extent while placing a priority on shielding glare light until the viewing angle θ reaches approximately 40 degrees.

Further, in the range where the viewing angle θ ranges from 20 to 30 degrees, the visual sensitivity is relatively high and the density of the photoreceptors is also high. Although a region 97 where the viewing angle θ ranges from 20 to 30 degrees is part of the glare shielding region 93, it is therefore also effective in part of the region 97, the region where the viewing angle θ is greater than 30 degrees, to reduce the light blocking ratio so that the amount of shielded glare is slightly reduced and a clear field of view is provided. The region 97 is therefore also a region where the function of the eyeglass lens 10 can be flexibly set in accordance with the user or the application and the eyeglass lens 10 can be designed in a highly flexible manner, as in the case of the intermediate region 96.

In the eyeglass lens 10 and most other similar eyeglass lenses, the range where the viewing angle θ ranges from 40 to 45 degrees with respect to the visual axis 105 is a region to be processed and assembled into a frame. The region is a frame region 94 of the eyeglass lens 10. The frame region 94 therefore shields glare light.

As described above, in consideration of achieving the function of shielding glare, several functional regions can be set as a function of the viewing angle θ, which is measured with respect to the visual axis 105, which passes through the eyepoint 11. As described with reference to FIG. 8, visual regions including the front side 10a and the rear side 10b of the eyeglass lens 10 can be defined as a function of the viewing angle θ, and the regions where the respective functions can be defined as a function of viewing angle θ are defined by concentric circles around the eyepoint 11 in the visual region of the eyeglass lens 10. In the following description, the visual regions may be described only on the front side 10a or the rear side 10b in some cases. In this case, the donut-shaped appearance on the front side 10a of the eyeglass lens 10, which is shown in FIG. 1 or 3, can be related to the glare shielding functions, and the eyeglass lens 10 can provide both the glare shielding functions and the novel exterior appearance.

Figure 11:
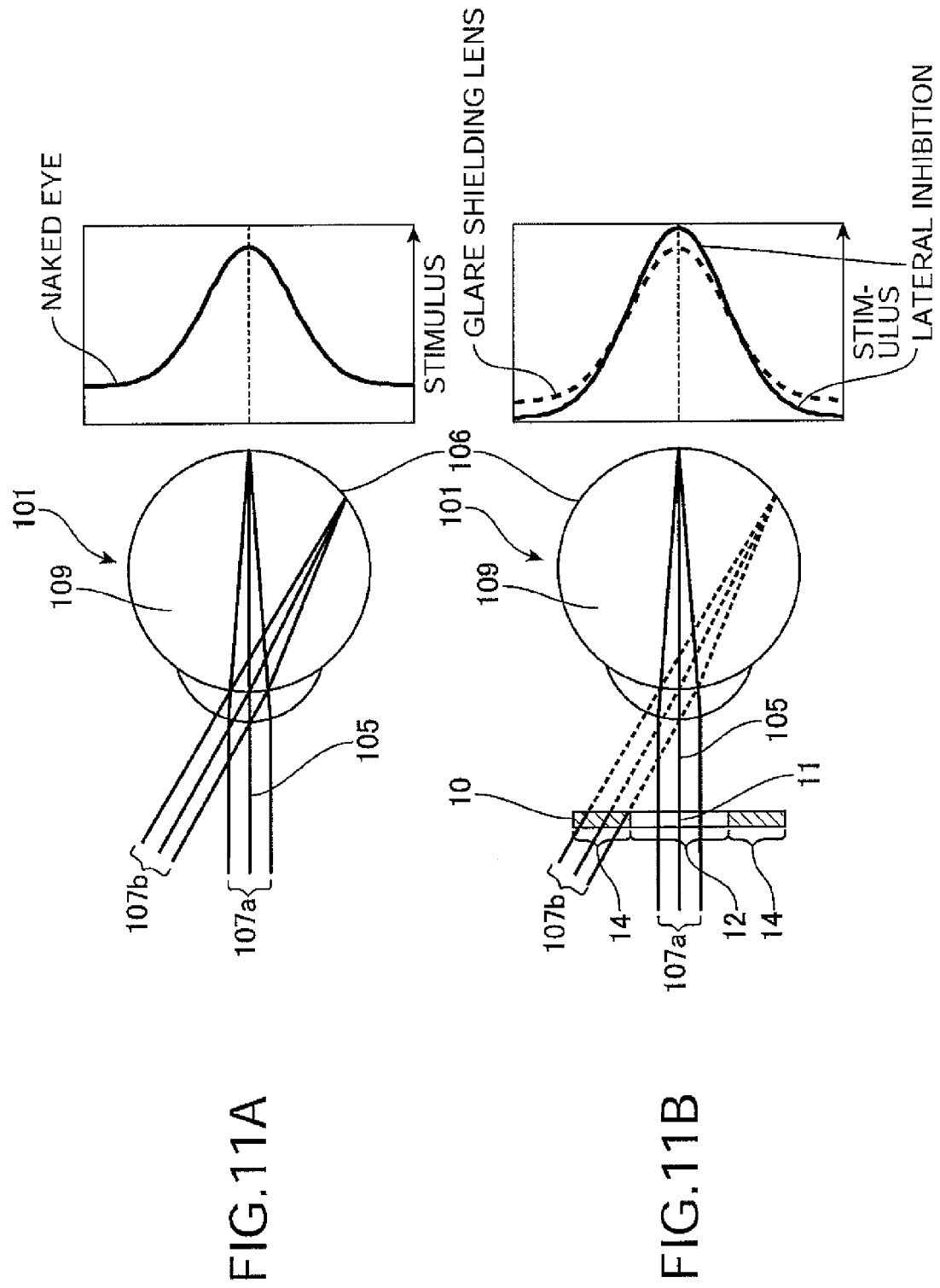
FIG. 11A diagrammatically shows the sensitivity at which an image produced in a naked eyeball is sensed, and FIG. 11B diagrammatically shows the sensitivity at which an image produced in an eyeball is sensed when a glare-shielding eyeglass lens is placed in front of the eyeball.

FIGS. 11A and 11B diagrammatically show the effect of shielding the disability glare light 52. FIG. 11A diagrammatically shows the sensitivity at which an image produced in the naked eyeball 101 is sensed (no glare is shielded). A light flux 107a from an object at a point of fixation and glare light (disability glare light) 107b are incident on the eyeball 101. Some of the glare light 107b is focused on the retina 106 and some are irregularly reflected in the crystalline lens 109.

FIG. 113 diagrammatically shows the sensitivity at which an image produced in the eyeball 101 is sensed when the glare-shielding eyeglass lens 10 is placed in front of the eyeball 101. The eyeglass lens 10 has the high light-transmissive region 12 around the eyepoint 11 and the low light-transmissive region 14 formed around the high light-transmissive region 12 and showing high light blocking ability. The light flux 107a from the object at the point of fixation is incident on the eyeball 101 as in the case of the naked eye, but the glare light (disability glare light) 107b is significantly reduced in terms of intensity by the low light-transmissive region 14. As a result, very little amount of glare light 107b is focused on the retina 106, and the glare light 107b is unlikely irregularly reflected in the crystalline lens 109. It is therefore conceivable that the eyeball 101 shows improved contrast sensitivity to an image recognized via the retina 106. Suppressing the luminance (stimulus) of a surrounding image allows a low-sensitive portion adjacent to a high-sensitive portion to be stimulated more weakly and the high-sensitive portion adjacent to the low-sensitive portion to be stimulated more strongly, whereby the object appears sharp. This is called lateral inhibition in some cases.

1.3 Experiment on Glare Shielding Effect

Figure 12:
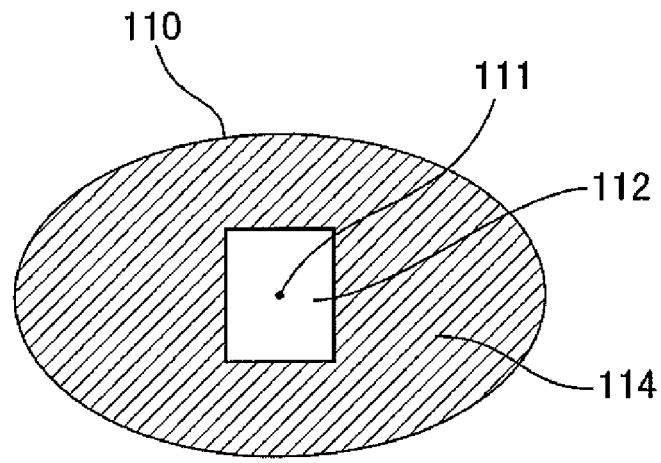
FIG. 12 is a front view of an eyeglass lens sample used in an experiment on a glare shielding effect.

FIG. 12 shows an eyeglass lens sample 110 used in an experiment on the glare shielding effect. The eyeglass lens sample 110 has a transparent region 112 corresponding to the high light-transmissive region 12 in a central portion of the lens and an opaque region 114 corresponding to the low light-transmissive region 14 in a peripheral portion of the lens. Specifically, the eyeglass lens sample 110 is as a whole an opaque member and has the transparent region 112 formed of an opening located in the central portion of the lens around an eyepoint (center position of pupil) 111 and sized to be ±5 mm in length in the upward and downward directions and ±4 mm in length in the rightward and leftward directions. The transparent region 112 is sized in such a way that the vertical viewing angle θ corresponds to approximately ±11 degrees and the horizontal viewing angle θ corresponds to approximately ±9 degrees.

FIGS. 13 to 16 show results of comparison experiments on contrast sensitivity. The comparison experiments were carried out by replacing the eyeglass lens sample 110 with an eyeglass lens sample that is colorless and transparent across both surfaces (comparative lens sample). Solid lines represent glare shielding results obtained when the eyeglass lens sample 110 described above was used, and broken lines represent glare shielding results obtained when the comparative lens sample was used for comparison. The horizontal axis of each of the figures represents the spatial frequency (cpd: cycle per degree). The spatial frequency represents how many sets of bright and dark (black and white) fringes are present per unit angular field of view, and cpd represents how many black and white pairs are present per degree. The vertical axis of each of the figures represents the contrast sensitivity and shows how much bright/dark contrast the subjects sensed when they looked at the fringes (black and white pairs).

The subjects were two males, a male A being 55 years old and a male B being 50 years old. The measurement was carried out by using a contrast sensitivity/glare measuring instrument CSV-1000 manufactured by VectorVision Instruments, and the measurement distance was set at 2 m.

Figure 13:
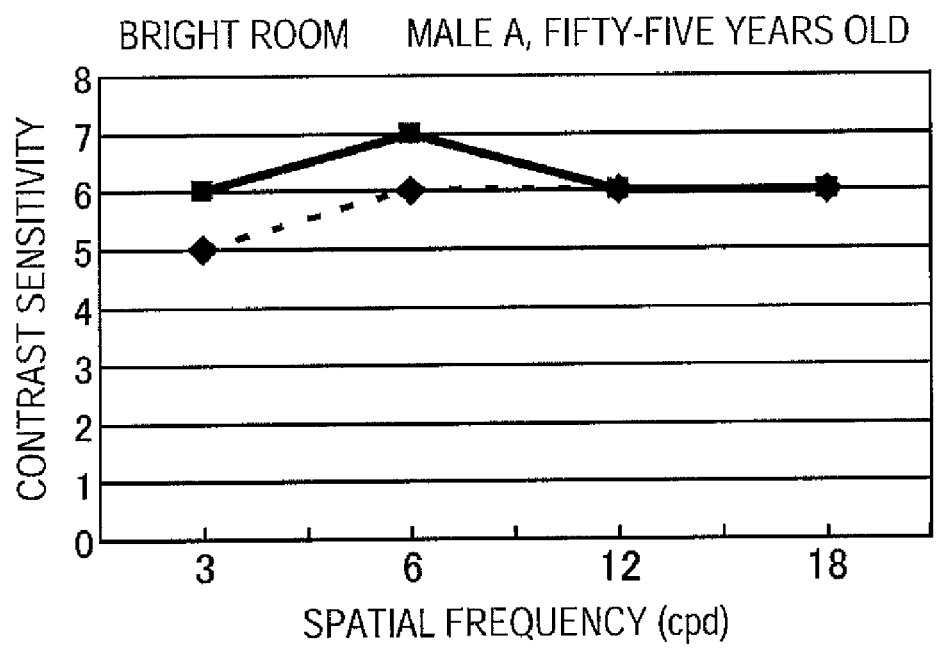
FIG. 13 shows contrast sensitivity obtained by using the eyeglass lens shown in FIG. 12 in a bright room.
Figure 14:
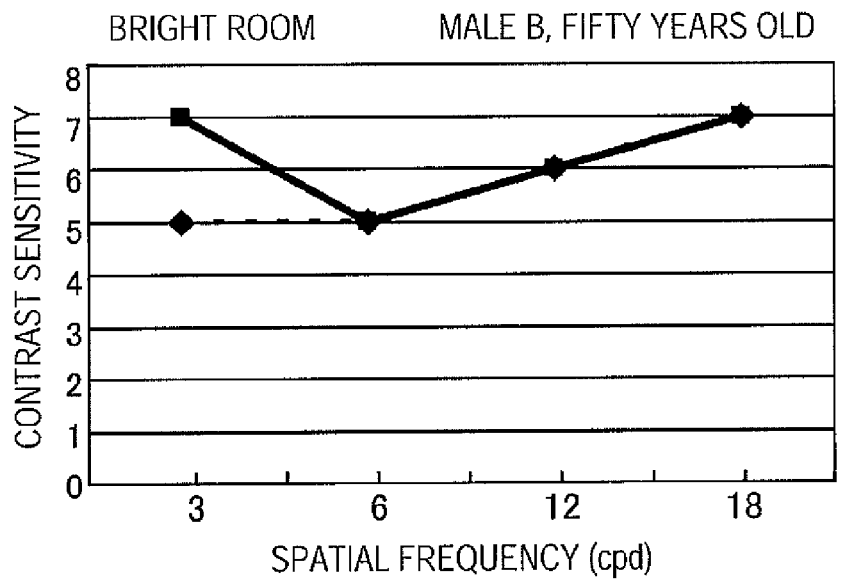
FIG. 14 shows different contrast sensitivity obtained by using the eyeglass lens shown in FIG. 12 in the bright room.

FIGS. 13 and 14 show measurement results obtained in a bright room where no glare light was present. Even when no glare light was present, using the eyeglass lens sample (glare shielding sample) 110 improved the contrast sensitivity in a low frequency band (spatial frequency band ranging from 3 to 6 cpd).

Figure 15:
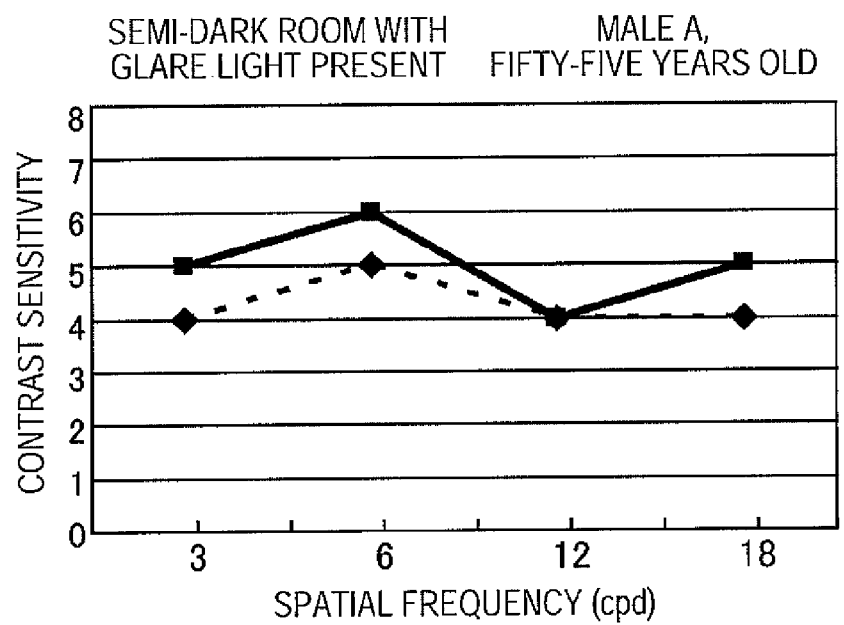
FIG. 15 shows contrast sensitivity obtained by using the eyeglass lens shown in FIG. 12 in a semi-dark room.
Figure 16:
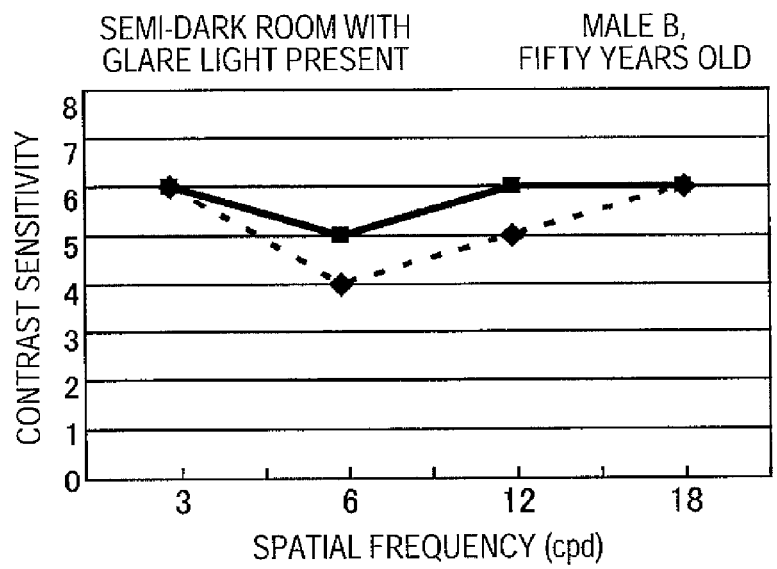
FIG. 16 shows different contrast sensitivity obtained by using the eyeglass lens shown in FIG. 12 in the semi-dark room.

FIGS. 15 and 16 show measurement results obtained in a semi-dark room where glare light was present. Although the male A and the male B showed different tendencies, using the glare shielding sample 110 provided results showing that the contrast sensitivity was improved across a broad spatial frequency band approximately from 3 to 18 cpd. It has therefore been found that using the glare shielding sample 110 possibly improves the contrast sensitivity even when no glare light is present, and that using the glare shielding sample 110 definitely improves the contrast sensitivity across a broad frequency band when glare light is present.

As confirmed in the experimental results described above, the eyeglass lens 10 having the high light-transmissive region 12 around the eyepoint 11 and the low light-transmissive region 14 surrounding the circumference of the high light-transmissive region 12 has the capability to shield (block) glare light and is effective in improving the contrast sensitivity. The eyeglass lens 10, which is designed in such a way that the light blocking ratio changes with the distance from the central eyepoint 11 and the light blocking ratio at the center is lower than that in the peripheral portion, that is, the transmittance at the center is high, has the high light-transmissive region 12 around the eyepoint 11 and the low light-transmissive region 14 surrounding the circumference of the high light-transmissive region 12, whereby the eyeglass lens 10 has a glare shielding capability and is hence effective in improving the contrast sensitivity.

Further, the eyeglass lens 10 shown in FIGS. 1 to 4 is designed to have the gradient region 16 where the density (shading) of the color of the lens gradually increases from the high light-transmissive region 12 toward the low light-transmissive region 14 so that no clear boundary is present between the high light-transmissive region 12 and the low light-transmissive region 14. Since the density (shading) of the color of the lens gradually changes over the eyeglass lens 10, the wearer does not feel strange about the field of view. In addition to this, the eyeglass lens 10 can be casually used and highly fashionable. As a result, the eyeglasses 1 including the eyeglass lenses 10 can be worn not only by a typical user as a fashionable, functional item but also by a user who suffers from a disorder with no unpleasant feeling for daily use.

Further, in the eyeglass lens 10, the light blocking ratio in the low light-transmissive region 14 is limited to approximately 40% (approximately 90% is achievable by the function of the light control layer 30 when ultraviolet light is strong) in the peripheral portion of the eyeglass lens 10 so that a certain level of light transmittance is ensured particularly for nighttime use and for room use. As a result, glare light is shielded to some extent in the low light-transmissive region 14, but the field of view of the low light-transmissive region 14 is not completely masked, whereby the visual sensitivity and the photoreceptors of the eyeballs 101 are used as much as possible so that a wide field of view is provided.

Further, an attempt is made by the gradient region 16 to not only improve the exterior appearance but also shield the disability glare light 52 and provide a clear field of view at the same time by gradually increasing the light blocking ratio from the eyepoint 11 toward the periphery (outer portion). This configuration therefore also allows the eyeglass lens 10 to have a wider field of view and suppress the influence of glare light. Further, even when a clear field of view and glare shielding are not allowed at the same time, the least movement of the eyeballs or the head can readily achieve a condition under which the user most readily view a target because the gradient region 16 and the low light-transmissive region 14 surround the entire circumference of the high light-transmissive region 12 (bright region) with respect to and all around (360 degrees) the eyepoint 11.

The gradient region 16 and the low light-transmissive region 14 are effective in shielding not only the disability glare light 52 but also the discomfort glare light 51 because they can inherently shield glare light. Further, since the gradient region 16 and the low light-transmissive region 14 are disposed all around the eyepoint 11, glare light can be shielded by moving the visual axis 105 in any direction. The influence of the discomfort glare light 51 can therefore be suppressed by moving the eyeballs or the head in a direction in which the movement of the visual axis 105 is minimized so as to shift the discomfort glare light 51 into the range of the disability glare light 52.

As described above, the eyeglass lens 10 can be used by a wide variety of users because it excels both in functionality and exterior appearance. The eyeglass lens 10 is therefore highly marketable and may hence be manufactured at low cost. As a result, the eyeglasses 1 are a universally designed product in many senses that it can also be supplied at low cost to users who suffer from functional disorders, is readily used by everybody, is easy to use and has a number of freedoms in use, and can be casually used.

Further, the eyeglass lens 10 includes the light control layer 30, which senses light (ultraviolet light) in a daylight, outdoor environment and changes its color to black or any other dark color, whereby the light blocking ratio in the high light-transmissive region 12 as well as the low light-transmissive region 14 can be increased. The high light-transmissive region 12 can therefore also shield ultraviolet light and glare. Further, in the eyeglass lens 10 in which the change in color of the light control layer 30 is dominant over the colored hard-coat layer 43, the entire eyeglass lens 10 appears to be a lens having a substantially single dark color in a daylight, outdoor environment, whereas the colored hard-coat layer 43 provides a visible donut-shaped or ring-shaped pattern in a night environment and an indoor environment. The eyeglass lens 10 can thus be a product whose exterior appearance changes depending on time and location. The eyeglass lens 10 and the eyeglasses 1 can therefore be provided as products that can be used anytime and anywhere because they have a variety of functions, such as color change and polarization of the entire eyeglass lens 10, the glare shielding capability as a function of the viewing angle, and a highly decorative exterior appearance.

In the eyeglass lens 10, the range where the viewing angle θ is at least 10 degrees (for example, the range where the radius from the eyepoint 11 ranges from 4 to 5 mm when the eyeglass fitting distance L is 25 mm (the same applies in the following description) is preferably the high light-transmissive region 12 so that the high light-transmissive region 12 matches with the discriminating vision region 91. The range where the viewing angle θ is at least 15 degrees (the range where the radius from the eyepoint 11 ranges from 6.5 to 7.5 mm) or the range where the viewing angle θ is at least 20 degrees including the intermediate region 96 (the range where the radius from the eyepoint 11 ranges from 8.5 to 9.5 mm) may alternatively be the high light-transmissive region 12 in consideration of the free vision region 95. In the high light-transmissive region 12, the total light blocking ratio in the visible light range including the near-ultraviolet light range or the near-infrared light range is preferably 95% or lower. The total light blocking ratio may be achieved by the colored hard-coat layer 43 or by the combination of the colored hard-coat layer 43 with the light control layer 30. To ensure a clear field of view, the total light blocking ratio is desirably 90% or lower, more preferably 80% or lower, still more preferably 70% or lower. On the other hand, the total light blocking ratio of the high light-transmissive region 12 is preferably 0% or higher. For users who desire better exterior appearance or always desire to shield light, the total light blocking ratio may be 5% or higher or 10% or higher.

The range where the viewing angle θ exceeds 20 degrees (the range where the radius from the eyepoint 11 exceeds 8.5 to 9.5 mm) is preferably the low light-transmissive region 14 in consideration of the glare shielding region 93. The range where the viewing angle θ exceeds 15 degrees (the range where the radius from the eyepoint 11 exceeds 6.5 to 7.5 mm) may alternatively be the low light-transmissive region 14 in consideration of the free vision region 95. Still alternatively, the range where the viewing angle θ exceeds 10 degrees (the range where the radius from the eyepoint 11 exceeds 4 to 5 mm) excluding the discriminating vision region 91 may be the low light-transmissive region 14. In the low light-transmissive region 14, the total light blocking ratio in the visible light range including the near-ultraviolet light range or the near-infrared light range may be 100% when a priority is placed on shielding glare in the region outside the gradient region 16, for example, in the range where the viewing angle θ exceeds 40 degrees (the range where the radius from the eyepoint 11 exceeds 20.5 to 21.5 mm) or the range where the viewing angle θ exceeds 30 degrees (the range where the radius from the eyepoint 11 exceeds 14 to 15 mm). The total light blocking ratio is, however, preferably 95% or lower in consideration of ensuring the field of view. The total light blocking ratio in the low light-transmissive region 14 may be achieved by the colored hard-coat layer 43 or by the combination of the colored hard-coat layer 43 with the light control layer 30, as in the case of the high light-transmissive region 12. To ensure a clear field of view, the total light blocking ratio is desirably 90% or lower, more preferably 80% or lower, still more preferably 70% or lower. On the other hand, the total light blocking ratio in the low light-transmissive region 14 but at least outside the gradient region 16 is preferably 10% or higher, more preferably 20% or higher, still more preferably 30% or higher, in order to shield glare.

1.4 Manufacturing Method
1.4.1 Manufacturing Lens Body

An exemplary method for manufacturing the eyeglass lens 10 described above will be described. In this example, a description will be made of a case where the eyeglass lens 10 including the hard-coat layer 43 that can be colored after the anti-reflection layer 44, the antifouling layer (water repellent layer) 45, and the other preceding layers are stacked, and then the donut-shaped coloring is performed. The eyeglass lens 10 including the hard-coat layer 43 that can be colored after the anti-reflection layer 44, the antifouling layer (water repellent layer) 45, and the other preceding layers are stacked is described in detail in JP-A-2006-139247, which was filed by the applicant of the present application.

The eyeglass lens 10 has the configuration shown in FIG. 4. First, the lens base 41 having desired optical performance is formed, for example, by using Seiko Super Sovereign lens material (SSV) manufactured by SEIKO EPSON CORPORATION.

The primer layer (ground layer) 42, which improves the adherence between the lens base 41 and the hard-coat layer 43, is then formed on both sides of the plastic lens base 41 in a dipping process. An application liquid P1 for forming the primer layer 42 is prepared, for example, by mixing 100 parts of commercially available polyester resin "PESRESIN A-160P" (manufactured by TAKAMATSU OIL & FAT CO., LTD., water-dispersion emulsion, solid content concentration: 27%), 84 parts of rutile titanium oxide complex sol (manufactured by Catalyst & Chemical Company, Product Name: Optolake 1120Z), 640 parts of methyl alcohol as a diluting solvent, and one part of silicone-based surface active agent (manufactured by Nippon Unicar Company Limited, Product Name: "SILWET L-77") as a leveling agent and agitating the mixture into a homogeneous state. The primer layer 42 is formed by applying the application liquid P1 onto both surfaces of the lens base 41 in a dipping process (pulling out speed: 15 cm/min) and drying the lens base 41 having undergone the application process by air at 80° C. for 20 minutes. The primary layer 42 thus formed with the application liquid P1 is then burned. The solid content of the burned primer layer 42 contains 62 wt % of polyester resin and 38 wt % of rutile titanium oxide complex sol.

The colorable hard-coat layer 43, which improves the surface hardness of the plastic lens base 41, which is more prone to be scratched than a glass lens base, is formed over each surface of the lens base 41, on which the primer layer 42 has been layered. An application liquid H1 for forming the hard-coat layer 43 is prepared, for example, by mixing 138 parts of propylene glycol methyl ether and 688 parts of rutile titanium oxide complex sal (manufactured by Catalyst & Chemical Company, Product Name: Optolake 1120Z), further mixing the mixture with 106 parts of γ-glycidoxy-propyl-trimethoxy-silane and 38 parts of glycerol polyglycidyl ether (manufactured by Nagase Chemicals Co., Ltd., Product Name: Denacol EX313), dripping 30 parts of 0.1-N hydrochloric acid aqueous solution into the resultant mixture liquid while agitating the mixture liquid, further agitating the resultant mixture liquid for four hours, and then leaving the resultant mixture liquid for a whole day and night for aging. Thereafter, 1.8 parts of Fe(III) acetylacetonato and 0.3 part of silicone-based surface active agent (manufactured by Nippon Unicar Company Limited, Product Name: L-7001) are added to the mixture liquid. The application liquid H1 is applied onto the surface of each of the primer layers 42 in a dipping process (pulling out speed: 35 cm/min), drying the lens base 41 having undergone the application process by air at 80° C. for 30 minutes, and burning the resultant product at 120° C. for 120 minutes to form the hard-coat layer 43 having a thickness of 2.3 μm. The thus formed hard-coat layer 43 contains a sufficient amount of glycerol polyglycidyl ether, which is a polyfunctional epoxy compound, and becomes a colorable hard-coat layer. The solid content of the burned hard-coat layer 43 formed with the application liquid H1 contains 55 wt % of metal oxide fine particles (rutile titanium oxide complex sol), 30 wt % of organic silicon (γ-glycidoxy-propyl-trimethoxy-silane), and 15 wt % of polyfunctional epoxy compound (glycerol polyglycidyl ether).

The anti-reflection layer 44, which prevents surface reflection of light, is formed over each surface of the lens base 41, on which the hard-coat layer 43 has been layered. An application liquid (low refractive index liquid) AR1 for forming the anti-reflection layer 44 is prepared, for example, by mixing 14 parts of γ-glycidoxy-propyl-trimethoxy-silane and 15 parts of tetramethoxy silane, dripping 13 parts of 0.1-N hydrochloric acid aqueous solution into the mixture while agitating the mixture, further agitating the resultant mixture liquid for four hours, leaving the resultant mixture liquid for a whole day and night for aging, adding 878 parts of propylene glycol methyl ether, 80 parts of hollow silica sol (manufactured by Catalyst & Chemical Company, Product Name: OSCAL (customized)), 0.04 part of magnesium perchlorate, and 0.3 part of silicone-based surface active agent (manufactured by Nippon Unicar Company Limited, Product Name: L-7001) to the resultant mixture liquid. The porous anti-reflection layer (low refractive index film) 44 having a thickness of approximately 100 nm is formed by making each surface of the lens base 41 (the surface of each of the hard-coat layers 43) hydrophilic in a plasma process, applying the application liquid AR1 onto the surface of the hard-coat layer 43 in a wet process (dipping process (pulling out speed: 15 cm/min)), drying the lens base 41 having undergone the application process by air at 80° C. for 30 minutes, and burning the resultant product at 120° C. for 60 minutes. The solid content of the burned anti-reflection layer 44 formed with the application liquid AR1 contains 25 wt % of γ-glycidoxy-propyl-trimethoxy-silane, 15 wt % of tetramethoxy silane, and 60 wt % of hollow silica sol. The present liquid contains no polyfunctional epoxy compound (glycerol polyglycidyl ether).

Each surface of the lens base 41 over which the anti-reflection layer 44 has been layered is made to be water repellent by using a fluorine-based silane compound. The eyeglass lens 10 provided with the water-repellent films (antifouling layers) 45 is thus formed. Before the water repellency treatment, a liquid (coating liquid) having a light control capability is applied onto the front side 10*a* of the eyeglass lens 10 to form the light control layer 30. The coating liquid having a light control capability may, for example, contain a photochromic compound, a radically polymerizable monomer, and an amine compound, the radically polymerizable monomer having a silanol group or a group that produces a silanol group in a hydrolysis process.

1.4.2 Coloring

In the present example, the thus manufactured eyeglass lens 10 with water repellent films is dipped into a disperse coloring agent bath to manufacture the eyeglass lens 10 having a desired pattern. The disperse coloring agent can, for example, be a coloring agent Amber D for Seiko Plucks Diacoat. The color and the pattern can be changed by changing the coloring agent.

Figure 17:
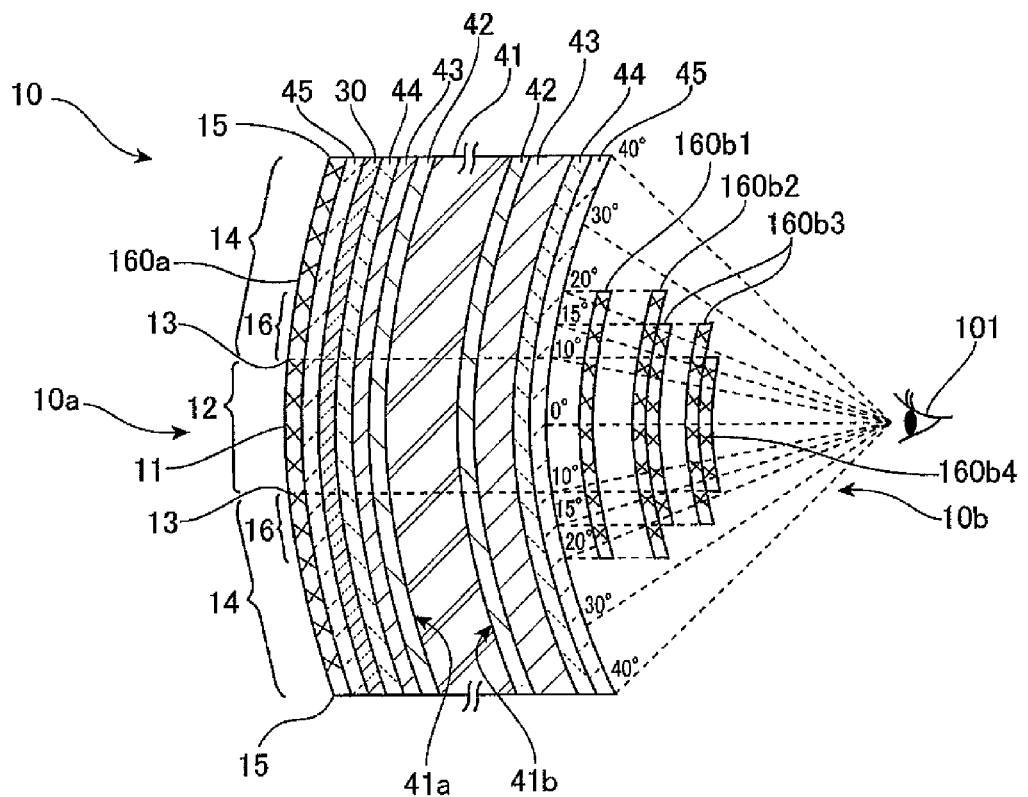
FIG. 17 shows an example of coloring.

As shown in FIG. 17, an anti-coloring film 160*a* is formed over the entire front side (object side) 10*a* of the eyeglass lens 10, and an anti-coloring film 160*b*1 is formed on the rear side (side where the eyeball 101 is present) 10*b* in such a way that the region where the viewing angle θ is 20 degrees or smaller is covered but the region where the viewing angle θ is 20 degrees or greater is not covered. The anti-coloring film can be made of a material having a coloring prevention effect, for example, formed of a mask or a masking sheet made of any of a variety of adhesives or non-permeable materials. The region of the hard-coat layer 43 where the viewing angle θ is 20 degrees or greater is colored by dipping the eyeglass lens 10 in a disperse coloring agent bath at 94° C. for 10 minutes.

After the first coloring process, the anti-coloring film 160b1, which covers the rear side 10b of the eyeglass lens 10, is replaced with a combination of an anti-coloring film 160b2 that matches with the range where the viewing angle θ ranges from 15 to 20 degrees and is made of a coloring agent whose permeability depends on distance or angle and an anti-coloring film 160b3 that matches with the range where the viewing angle θ ranges from 0 to 15 degrees and is made of a coloring agent whose permeability has no dependency. The eyeglass lens 10 is dipped into the disperse coloring agent bath at 94° C. for 10 minutes. In this way, the region of the hard-coat layer 43 where the viewing angle θ is 20 degrees or greater is further colored, and the region where the viewing angle θ ranges from 15 to 20 degrees undergoes angle-dependent coloring.

Similarly, the anti-coloring films 160b2 and 160b3, which cover the rear side 10b of the eyeglass lens 10, are replaced with a combination of the anti-coloring film 160b3 that matches with the range where the viewing angle θ ranges from 10 to 15 degrees and is made of the coloring agent whose permeability depends on distance or angle and an anti-coloring film 160b4 that matches with the range where the viewing angle θ ranges from 0 to 10 degrees and is made of a coloring agent whose permeability has no dependency. The eyeglass lens 10 is dipped into the disperse coloring agent bath at 94° C. for 10 minutes. As a result, the region of the hard-coat layer 43 where the viewing angle θ is 15 degrees or greater is further colored, and the region where the viewing angle θ ranges from 10 to 15 degrees undergoes angle-dependent coloring. In this way, the eyeglass lens 10 having the gradient region 16, where the density (shading) of the color of the lens gradually increases from the high light-transmissive region 12 toward the low light-transmissive region 14, can be manufactured and provided.

The hard-coat layer 43 can alternatively be colored in finer steps to form the gradient area 16 whose color changes to multiple levels. Further, the coloring of the eyeglass lens is not limited to the method described above, but the lens base 41 may alternatively be colored, or the donut-shaped pattern may be formed by applying a treatment liquid in an inkjet or spraying process. A method for applying a treatment liquid onto a surface of a lens in an inkjet process is described, for example, in JP-A-2001-327908, which has been filed by the applicant of the present application.

1.5 Fashionable Exterior Appearance of Eyeglass Lens having Gradient Region

As described above, the eyeglass lens 10 has the region (gradient region) 16, which surrounds the entire circumference of the high light-transmissive region 12 and where the light blocking ratio changes toward the periphery, whereby the eyeglass lens 10 and eyeglasses 1, which have a highly fashionable, novel exterior appearance and whose light blocking ratio changes along concentric donut or annular shapes, can be provided. That is, the eyeglass lens 10, whose light blocking ratio can be changed by changing the density (shading) of the color of the lens and the color changes along concentric donut or annular shapes, is recognized as a highly fashionable eyeglass lens 10 with novel decoration. The control (adjustment) of the light blocking ratio performed in the coloring process described above is presented by way of example, and the light blocking ratio may alternatively be controlled by adjusting the performance of the anti-reflection layer 44 to change the reflectance (transmittance) or by changing the open area ratio, for example, by using a fine pattern. In either case, the eyeglass lens 10 can provide the change in the light blocking ratio in the form of externally visible change.

Further, the eyeglass lens 10 has the high light-transmissive region 12 and the low light-transmissive region 14 surrounding the entire circumference of the high light-transmissive region 12 and having the gradient region 16. As a result, the high light-transmissive region 12 can ensure the field of view, and the low light-transmissive region can shield (block) glare light, as described above. Therefore, the eyeglasses 1 including the eyeglass lenses 10 can be worn as an item not only for users who suffer from the cataract or other ocular diseases and hence desire functional enhancement by using glasses having the low light-transmissive region 14 but also for typical users who desire to suppress influence of glare light to obtain a high-contrast image and prevent fatigue of the eyes and damage on the eyes due to strong visible light, near-ultraviolet light, or near-infrared light.

Having an aesthetic effect (fashionable exterior appearance) and an antiglare effect incorporated in a single lens, the eyeglass lens 10 can therefore be worn more casually by typical users and users who suffer from disorders.

2. Second Embodiment

Figure 18A:
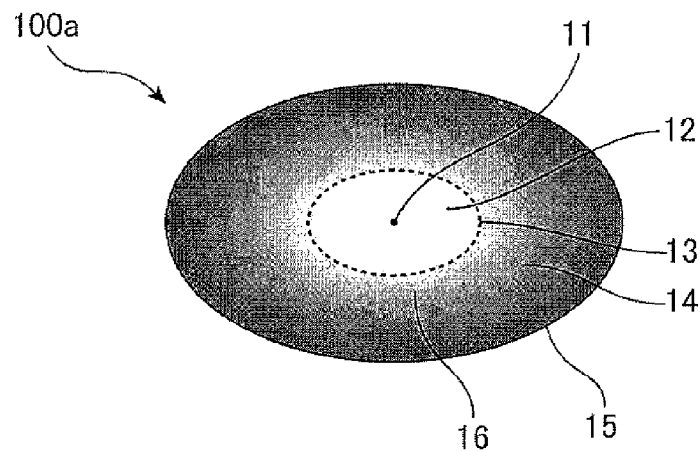
FIG. 18A is a front view of an eyeglass lens according to a second embodiment viewed from the object side.
Figure 18B:
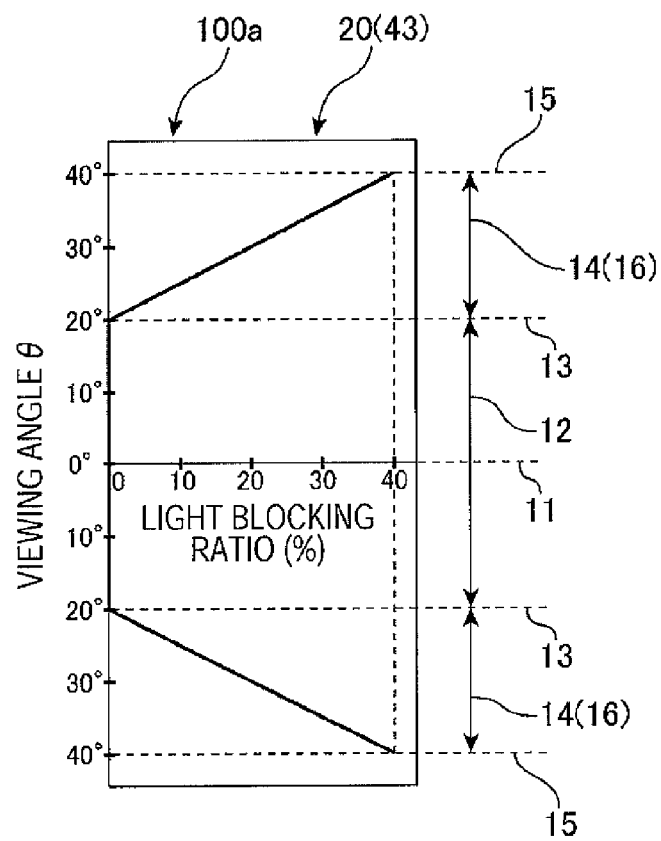
FIG. 18B shows the distribution of the light blocking ratio of a light blocking layer of the eyeglass lens according to the second embodiment.

FIG. 18A is a front view of an eyeglass lens 100a according to a second embodiment viewed from the object side. FIG. 18B shows the distribution of the light blocking ratio achieved by the light blocking layer 20. The eyeglass lens 100a also has the high light-transmissive region 12 including the eyepoint 11 and the low light-transmissive region 14 surrounding the entire circumference of the high light-transmissive region 12, and the low light-transmissive region 14 has the region (gradient region) 16 where the light blocking ratio is higher than that in the high light-transmissive region 12 and the light blocking ratio increases toward the periphery 15. The broken line representing the boundary 13 between the high light-transmissive region 12 and the low light-transmissive region 14 is an imaginary line and does not actually appear. The eyeglass lens 100a can also be incorporated in the eyeglass frame 9 as shown in FIGS. 1 and 2, and the eyeglasses 1 having a fashionable exterior appearance and a glare shielding capability can be provided. The portions in the present embodiment and the following embodiments that are common to those in the first embodiment have the same reference characters, and no description of the common portions will be made.

In the eyeglass lens 100a, the highly light-transmissive, high light-transmissive region 12 that hardly block light (the light blocking ratio is 0%, for example) extends to the point where the viewing angle θ is 20 degrees. Further, in the gradient region 16, where the light blocking ratio increases toward the periphery 15, the light blocking ratio increases from 0% to approximately 40% in the range where the viewing angle θ ranges from 20 to 40 degrees. The design of the eyeglass lens 100a therefore differs from that of the eyeglass lens 10 of the first embodiment in that a higher priority is placed on obtaining a clear image than on shielding glare in the intermediate region 96 where the viewing angle θ ranges from 10 to 20 degrees. The eyeglass lens 100a is therefore designed to readily ensure a wider field of view by extending the range of the high light-transmissive region 12, in particular, the range having a fixed light blocking ratio and being transparent as a whole, to the point where the viewing angle θ is 20 degrees, which corresponds to the limit of the eyeball moving region 92 including the discriminating and free vision regions.

In the eyeglass lens 100a as well, the light control layer 30 can be provided on the object side as in the first embodiment, and the change in color of the light control layer 30 allows the light blocking ratio of the entire eyeglass lens 100a (across the entire area of the eyeglass lens 100a) to be controlled. The light control layer 30 can be part of the eyeglass lens 100a or have regions whose the color change rates are different. The eyeglass lens 100a can alternatively be designed in a variety of ways by combining the light control layer 30 with the light blocking layer 20 obtained by coloring the hard-coat layer 43. The light control layer 30 can be combined as described above also in embodiments of other eyeglass lenses, which will be described below.

3. Third Embodiment

Figure 19:
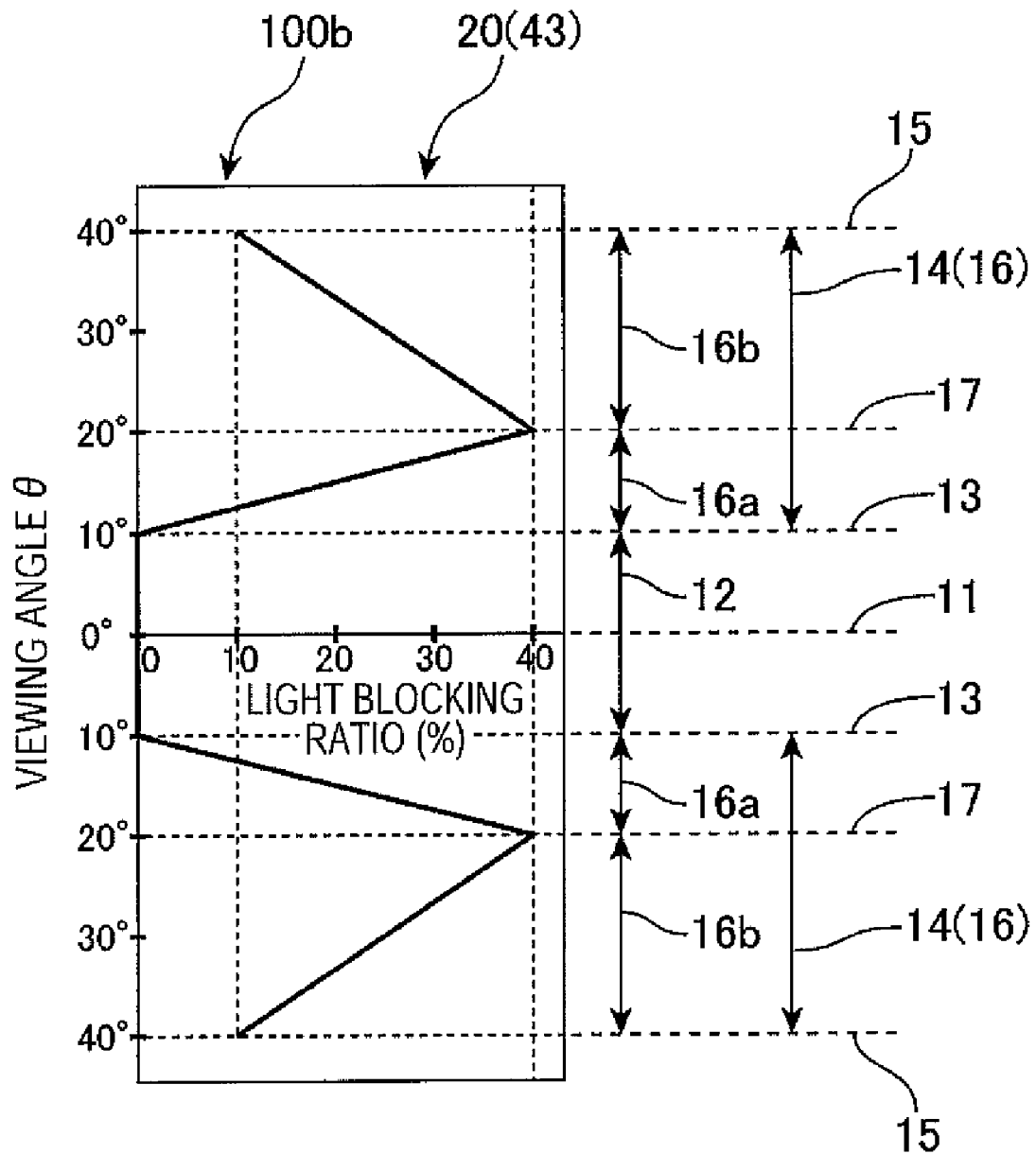
FIG. 19 shows the distribution of the light blocking ratio of a light blocking layer of an eyeglass lens according to a third embodiment.

FIG. 19 shows the distribution of (change in) the light blocking ratio of the light blocking layer 20 of an eyeglass lens 100b according to a third embodiment. The eyeglass lens 100b also has the high light-transmissive region 12 including the eyepoint 11 and the low light-transmissive region 14 surrounding the entire circumference of the high light-transmissive region 12. The low light-transmissive region 14 has the region (gradient region) 16 where the light blocking ratio is higher than that of the high light-transmissive region 12 and the light blocking ratio changes toward the periphery 15. In the eyeglass lens 100b, however, the gradient region 16 in the low light-transmissive region 14 has a region 16a where the color gradually but relatively sharply becomes darker toward the periphery 15 in the vicinity 17 of the boundary (circumference) 13 between the high light-transmissive region 12 and the gradient region 16 and a region 16b which is located outside the region 16a and whose color gradually becomes lighter toward the periphery 15. As described above, the low light-transmissive region 14 of the eyeglass lens 100b has the gradient region 16a where the light blocking ratio temporarily increases toward the periphery 15 and the gradient region 16b which is located outside the gradient region 16a and where the light blocking ratio decreases toward the periphery 15. For example, in the gradient region 16a, the light blocking ratio increases from 0% to approximately 40% in the range where the viewing angle θ ranges from 10 to 20 degrees, and in the gradient region 16b, the light blocking ratio decreases from 40% to 10% in the range where the viewing angle θ ranges from 20 to 40 degrees.

In the eyeglass lens 100b, the gradient region 16a, which is located inside and where the light blocking ratio temporarily increases toward the periphery, makes the boundary 13 between the high light-transmissive region 12 and the low light-transmissive region 14 blurred to prevent a clear boundary between the high light-transmissive region 12 and the low light-transmissive region 14 from being visible. Further, since the gradient region 16a allows the density (shading) of the color of the lens to temporarily become darker in a portion close to the high light-transmissive region 12, the eyeglass lens 100b can be designed to have high originality that impacts the appearance of the eyes.

Further, in the gradient region 16b, the light blocking ratio gradually decreases toward the periphery 15, in contrast with the embodiment described above. As shown in FIG. 7, even where disability glare light (blinding glare light) 52 is concerned, the visual efficiency (visibility) decreases as the glare angle φ decreases, whereas the influence of glare light decreases as the glare angle φ increases. Therefore, the light blocking ratio may increase as the viewing angle θ decreases and the light blocking ratio may decrease as the viewing angle θ increases from the viewpoint of shielding disability glare light 52. As shown in FIG. 7, the visual efficiency is improved in proportion to the glare angle φ in the range of the disability glare light 52. The light blocking ratio for shielding glare may therefore decrease in proportion to the viewing angle θ in the gradient region 16b. To this end, the low light-transmissive region 14 may have the region 16b, where the density (shading) of the color of the lens becomes lighter toward the periphery 15, as described with reference to the eyeglass lens 100b shown in FIG. 19, whereby the contrast sensitivity can be ensured for the wearer. Further, the change in color proceeding in a direction different from that in the embodiments described above, even when the color still changes along concentric donut shapes, is preferably recognized as a new exterior appearance.

4. Fourth Embodiment

Figure 20:
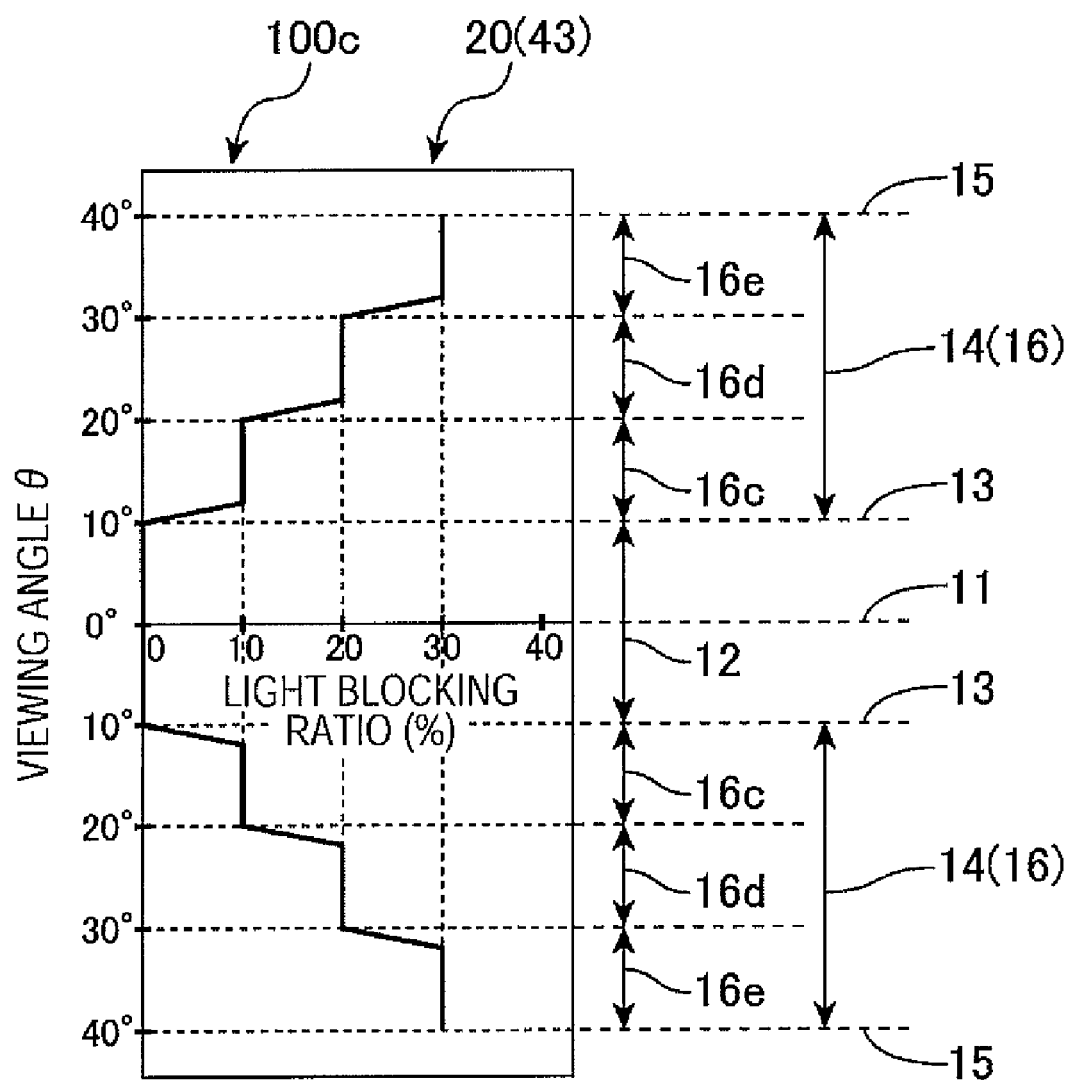
FIG. 20 shows the distribution of the light blocking ratio of a light blocking layer of an eyeglass lens according to a fourth embodiment.

FIG. 20 shows the distribution of (change in) the light blocking ratio of the light blocking layer 20 of an eyeglass lens 100c according to a fourth embodiment. The eyeglass lens 100c also has the high light-transmissive region 12 including the eyepoint 11 and the low light-transmissive region 14 surrounding the entire circumference of the high light-transmissive region 12. The low light-transmissive region 14 has the region (gradient region) 16 where the light blocking ratio is higher than that in the high light-transmissive region 12 and the light blocking ratio changes toward the periphery 15. In the gradient region 16 in the present example, the density (shading) of the color of the light blocking layer 20 changes to multiple levels. Specifically, the density changes to three levels in the gradient region 16: a region 16c where the light blocking ratio is 10% in the range where the viewing angle θ ranges from 10 to 20 degrees, a region 16d where the light blocking ratio is 20% in the range where the viewing angle θ ranges from 20 to 30 degrees, and a region 16e where the light blocking ratio is 30% in the range where the viewing angle θ ranges from 30 to 40 degrees.

At the boundary between the regions 16c to 16e in the gradient region 16 where the light blocking ratio changes to multiple levels, the light blocking ratio may change stepwise so that an edge caused by the change in density is visible in the exterior appearance of the eyeglass lens 100c. Alternatively, the light blocking ratio at the boundary between the regions 16c to 16e in the gradient region 16 may gradually change so that no edge is visible in the exterior appearance of the eyeglass lens 100c. The eyeglass lens 100c of the present example is designed in such a way that the light blocking ratio at the boundary between the regions 16c to 16e, where the light blocking ratio changes to multiple levels, gradually increases.

In the eyeglass lens 100c, the inner region 16c where the light blocking ratio is low corresponds to the intermediate region 92, where a priority is placed on the free observation. The region 16d located outside the region 16c corresponds to the region 97, where a priority is placed on preventing the blinding glare light 52 but the visual sensitivity of the eyeball 101 is used effectively at the same time. The region 16e located outside the region 16d corresponds to the glare shielding region 93, where a priority is placed on shielding the blinding glare light 52.

The gradient region 16, where the light blocking ratio changes to the multiple levels, can be manufactured by changing the amount of shading of the color of the lens in the coloring process, changing the color itself, or changing the reflectance. It is therefore possible to assign different hues in the multilevel regions. In this way, the exterior appearance can be selected from an increased range of candidates. The eyeglass lens 100c can therefore have enhanced fashionable exterior appearance and show value as decoration.

5. Fifth Embodiment

Figure 21:
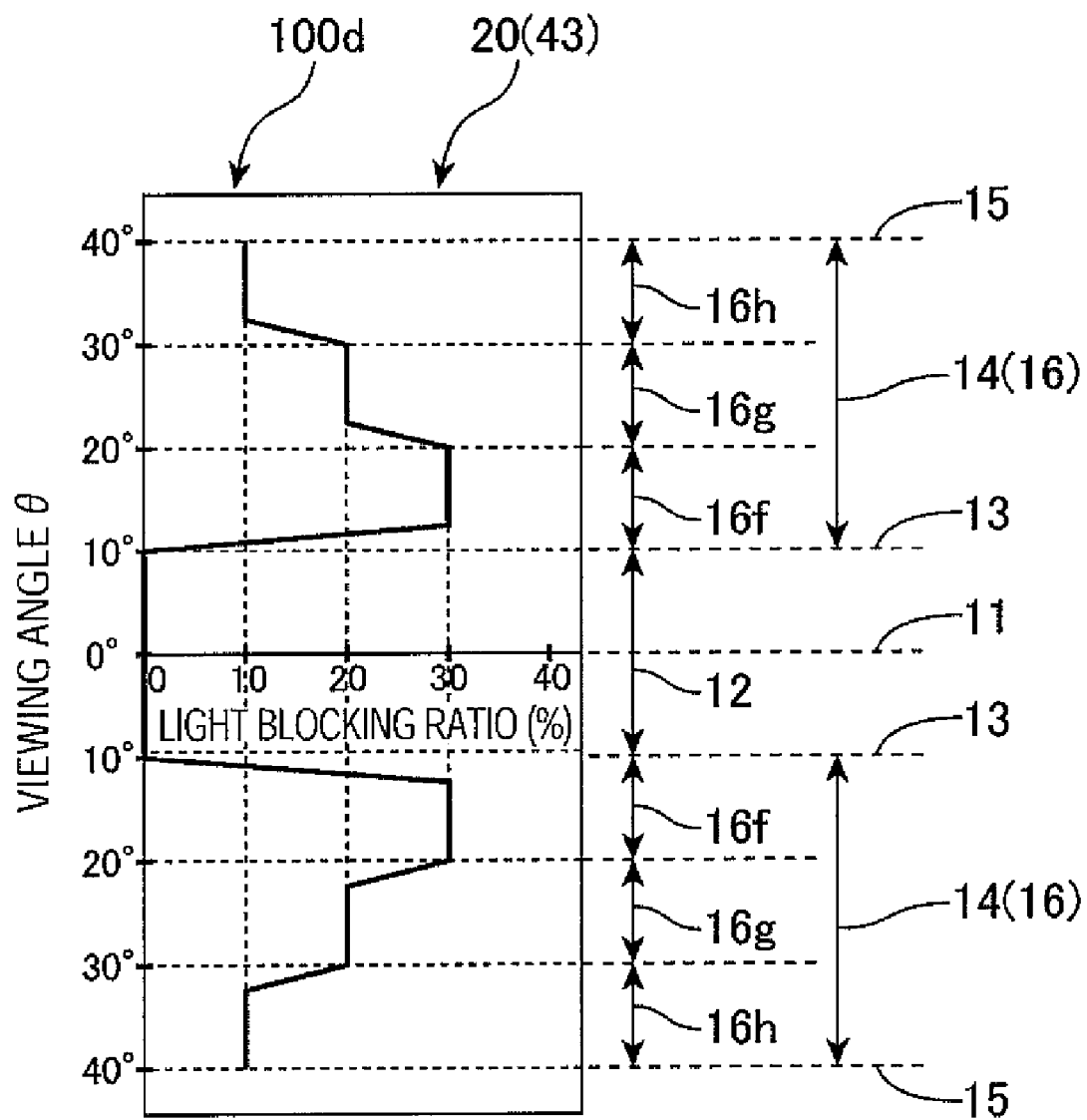
FIG. 21 shows the distribution of the light blocking ratio of a light blocking layer of an eyeglass lens according to a fifth embodiment.

FIG. 21 shows the distribution of (change in) the light blocking ratio of the light blocking layer 20 of an eyeglass lens 100d according to a fifth embodiment. The eyeglass lens 100d also has the high light-transmissive region 12 including the eyepoint 11 and the low light-transmissive region 14 surrounding the entire circumference of the high light-transmissive region 12. The low light-transmissive region 14 has the region (gradient region) 16 where the light blocking ratio is higher than that in the high light-transmissive region 12 and the light blocking ratio changes toward the periphery 15. The gradient region 16 in the present example also has regions 16f to 16h where the light blocking ratio changes to multiple levels. The regions 16f to 16h in this example where the light blocking ratio changes to multiple levels, however, decrease stepwise toward the periphery 15. That is, the light blocking ratio in the inner region 16f is 30% in the range where the viewing angle θ ranges from 10 to 20 degrees. The light blocking ratio in the region 16g located outside the region 16f is 20% in the range where the viewing angle θ ranges from 20 to 30 degrees. The light blocking ratio in the region 16h located outside the region 16g is 10% in the range where the viewing angle θ ranges from 30 to 40 degrees. The light blocking ratio at the boundary between the regions 16f to 16h may change sharply or gradually. Since the difference in light blocking ratio at the boundary between the innermost region 16f and the high light-transmissive region 12 is large, it is preferable to design the regions 16f to 16h in such a way that the light blocking ratio increases sharply but gradually toward the periphery 15.

The eyeglass lens 100d can impact the appearance of the eyes, as in the case of the eyeglass lens 100b of the third embodiment. In addition to this, glare light in a region where the viewing angle θ is small, where the disability glare light 52 is likely to reduce the visual efficiency the most, can be effectively shielded, whereby the contrast sensitivity can be increased. Further, the eyeglass lens 100d can be a colorful eyeglass lens that allows the wearer to enjoy change in hue.

6. Sixth Embodiment

Figure 22:
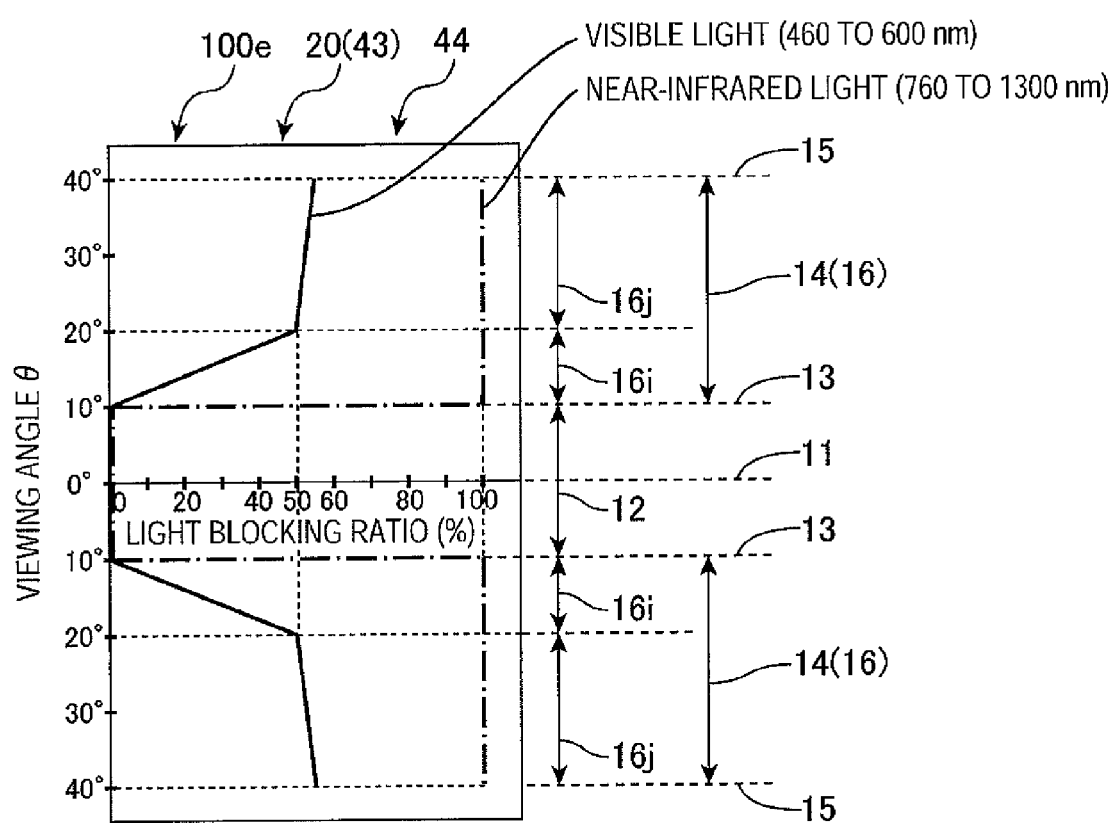
FIG. 22 shows the distribution of the light blocking ratio of a light blocking layer of an eyeglass lens according to a sixth embodiment.

FIG. 22 shows the distribution of (change in) the light blocking ratio of the light blocking layer 20 of an eyeglass lens 100e according to a sixth embodiment, that is, the distribution of the density of the colored hard-coat layer 43 on the rear side 10b and wavelength selectivity of the anti-reflection layer 44 on the front side 10a in a near-infrared light (wavelength ranging from 760 to 1300 nm). The light blocking layer 20 of the eyeglass lens 100e has the high light-transmissive region 12 including the eyepoint 11 and the low light-transmissive region 14. The low light-transmissive region 14 has the gradient region 16 where the coloring density (shading) gradually increases toward the periphery 15. Further, the portion of the anti-reflection layer 44 that corresponds to the low light-transmissive region 14 is designed not to selectively transmit near-infrared light, that is, the near-infrared light blocking ratio in the low light-transmissive region 14 is substantially 100%.

Wearers who suffer from retinal diseases, choroidal diseases, or other similar diseases are sensitive to optical stimuli and feel pain, and they often suffer from complicated inflammatory diseases. It is therefore desirable to avoid any stimulus that may lead to angiectasis and prevent near-infrared light from entering the eyeballs 101. On the other hand, blocking near-infrared light from entering the eyeglass lens across its surface may lower the sensitivity to long-wavelength visible light depending on the design of the anti-reflection layer 44. The decrease in sensitivity could compromise daily life. In the eyeglass lens 100e, selectively blocking near-infrared light in the low light-transmissive region 14 can not only block near-infrared light from the light source 103, which otherwise possibly enters the eyeball 101 constantly, like the disability glare light 52, but also suppress decrease in color sensitivity at the visual axis 105. Further, shielding the disability glare light 52 can improve the discrimination ability and hence suppress decrease in work efficiency.

The wavelength selectivity of the anti-reflection layer 44, when it is an inorganic multilayer film, can be achieved by setting the thickness of each layer in such a way that the transmittance for near-infrared light is lower than that for visible light. When the long wavelength selectivity of the anti-reflection layer 44 can be set substantially irrespective of visible light, it is effective to increase the near-infrared light blocking ratio over the entire surface of the eyeglass lens 100e. Further, a layer that reflects near-infrared light may be newly deposited in place of the anti-reflection layer 44.

Further, visible light may also be an optical stimulus to wearers who suffer from retinal diseases, choroidal diseases, and other similar diseases in some cases. The intensity of visible light (460 to 600 nm, for example) is therefore desirably halved. To this end, it is effective to relatively increase the density of the colored hard-coat layer 43 so that the light blocking ratio reaches approximately 50% in the glare shielding region 93. For example, the gradient region 16 in the low light-transmissive region 14 has a region 16i which corresponds to the intermediate region 96 where the viewing angle θ ranges approximately from 10 to 20 degrees and where the color gradually but relatively sharply becomes darker toward the periphery 15 and a region 16j which is located outside the region 16i, that is, corresponds to the glare shielding region 93 where the viewing angle θ ranges from 20 to 40 degrees and where the color gradually becomes darker toward the periphery 15. In the present example, in the gradient region 16i, the light blocking ratio increases from 0% to approximately 50% in the range where the viewing angle θ ranges from 10 to 20 degrees, and in the gradient region 16j, the light blocking ratio increases approximately from 50% to 60% in the range where the viewing angle θ ranges from 20 to 40 degrees. It is further desirable to combine the light control layer 30 so that the blocking ratio in the high light-transmissive region 12 around the eyepoint 11 is also 50% or higher in an outdoor environment or an environment where there is a strong optical stimulus.

Preventing near-infrared light from entering the eyeballs 101 is also effective in avoiding disorders of the eyeballs 101 from developing even for healthy users. It is therefore effective that not only users who suffer from disorders described above but also typical users use the eyeglass lens 100e. Further, the eyeglass lens 100e having the gradient region 16 can be provided as a highly fashionable eyeglass lens. That is, the eyeglass lens 100e is designed for universal use and can hence be worn not only for treatment but also as a fashionable item. Therefore, wearers who suffer from the disorders described above can casually use the eyeglass lens 100e under the condition that other people do not recognize that the wearers are under treatment, and typical users can also casually use the eyeglass lens 100*e* without any unpleasant feeling.

7. Seventh Embodiment

Figure 23:
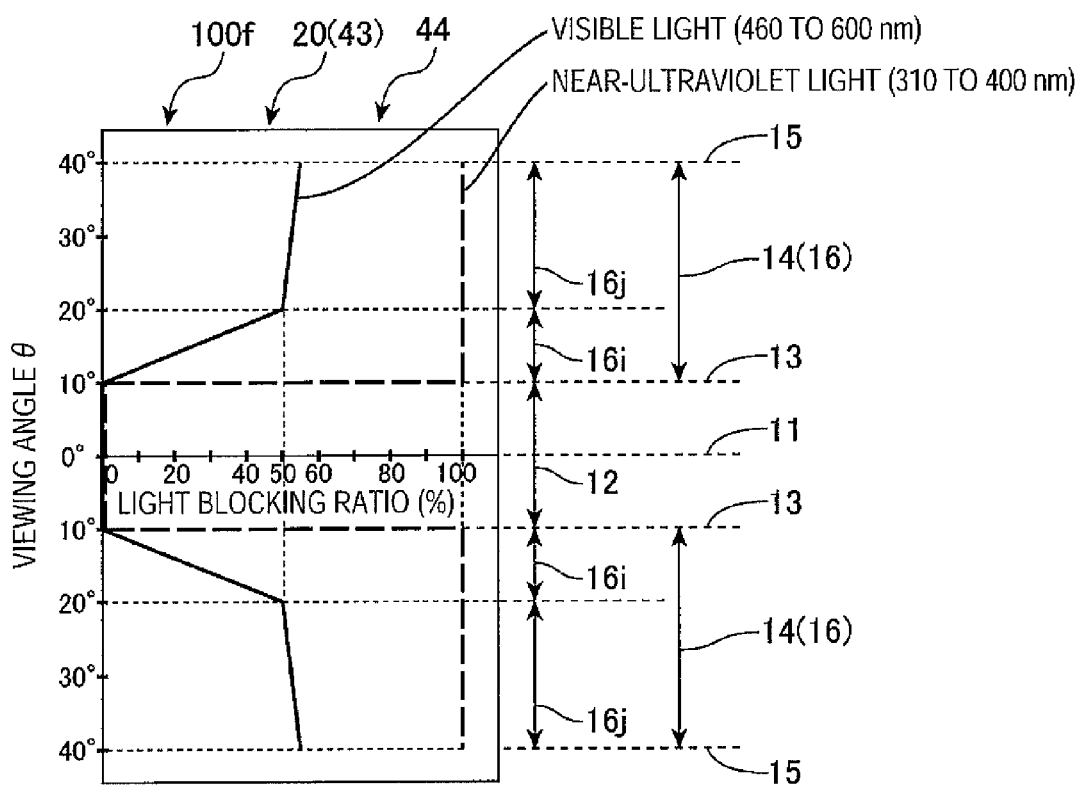
FIG. 23 shows the distribution of the light blocking ratio of a light blocking layer of an eyeglass lens according to a seventh embodiment.

FIG. 23 shows the distribution of (change in) the light blocking ratio of the light blocking layer 20 of an eyeglass lens 100*f* according to a seventh embodiment, that is, the distribution of the density of the colored hard-coat layer 43 on the rear side 10*b* and the wavelength selectivity of the anti-reflection layer 44 on the front side 10*a* in a near-ultraviolet light (wavelength ranging from 310 to 400 nm). The light blocking layer 20 of the eyeglass lens 100*f* has the high light-transmissive region 12 including the eyepoint 11 and the low light-transmissive region 14 provided around the high light-transmissive region 12. The low light-transmissive region 14 has the gradient region 16 where the coloring density (shading) gradually increases toward the periphery 15. Further, the portion of the anti-reflection layer 44 that corresponds to the low light-transmissive region 14 is designed not to selectively transmit near-ultraviolet light, that is, the near-ultraviolet light blocking ratio in the low light-transmissive region 14 is substantially 100%.

For wearers who suffer from corneal disorders, the cataract, the glaucoma, and other similar diseases, the contrast of an image on the retina significantly decreases due to scattered light produced in the eyeballs (crystalline lenses) and other ocular tissues. It is therefore desirable to prevent near-ultraviolet light, which has short wavelengths and is hence easily scattered, from entering the eyeballs 101. On the other hand, blocking near-ultraviolet light from entering the eyeglass lens across its surface may lower the sensitivity to short-wavelength visible light depending on the design of the anti-reflection layer 44. The decrease in sensitivity could compromise daily life. In the eyeglass lens 100*f*, selectively blocking near-ultraviolet light in the low light-transmissive region 14 can not only block near-ultraviolet light from the light source 103, which otherwise possibly enters the eyeball 101 constantly, like the disability glare light 52, but also suppress decrease in color sensitivity at the visual axis 105. Further, shielding the disability glare light 52 can improve the discrimination ability and hence suppress decrease in work efficiency.

The wavelength selectivity of the anti-reflection layer 44, when it is an inorganic multilayer film as in the example described above, can be achieved by setting the thickness of each layer in such a way that the transmittance for near-ultraviolet light is lower than that for visible light. Further, when the short wavelength selectivity of the anti-reflection layer 44 can be set substantially irrespective of visible light, it is effective to increase the near-ultraviolet light blocking ratio over the entire surface of the eyeglass lens 100*f*. Further, layer that reflects near-ultraviolet light may be newly deposited in place of the anti-reflection layer 44.

Further, visible light may also be scattered in the eyeballs of wearers who suffer from corneal disorders, the cataract, the glaucoma, and other similar diseases, leading to decrease in contrast. The intensity of visible light (460 to 600 nm, for example) is therefore desirably halved, as in the example described above. Preventing near-ultraviolet light as well as near-infrared light from entering the eyeballs 101 is also effective in avoiding disorders of the eyeballs 101 from developing even for healthy wearers. It is therefore effective that not only users who suffer from disorders described above but also typical users use the eyeglass lens 100*f*. Further, the eyeglass lens 100*f*, which can block near-ultraviolet light and attenuate visible light in a situation where the intensity of the visible light is high, is effective for a variety of users. In the embodiment of the invention, the eyeglass lens having the advantages described above can be provided as the eyeglass lens 100*f* including the gradient region 16 and having highly fashionable value. Therefore, a variety of users can casually use the eyeglass lens 100*f* without unpleasant feeling not only as a treatment tool but also as a fashionable item. Further, an eyeglass lens having the fashionable exterior appearance described above and capable of blocking both near-ultraviolet light and near-infrared light is also effective.

8. Eighth Embodiment

Figure 24:
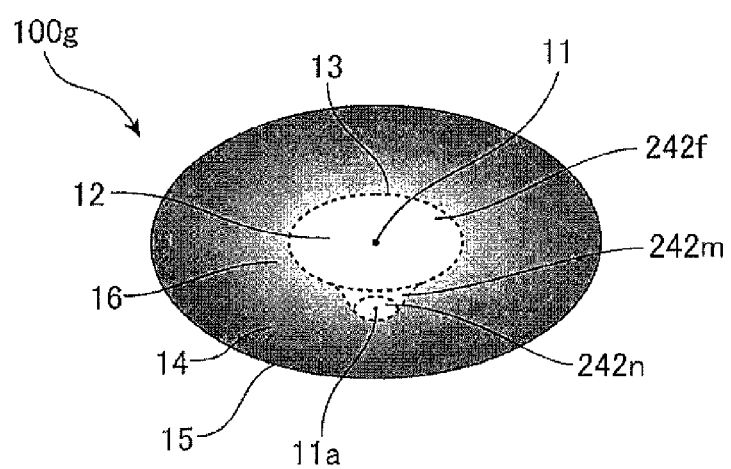
FIG. 24 is a front view of an eyeglass lens according to an eighth embodiment viewed from the object side.

FIG. 24 is a front view of an eyeglass lens 100*g* according to an eighth embodiment viewed from the object side. The eyeglass lens 100*g* is a progressive-power lens and has a distance region 242*f* for viewing a relatively distant point, a near region 242*n* for viewing a relatively near point, and a region 242*m* which is located between the distance region 242*f* and the near region 242*n* and where the power continuously changes. The eyeglass lens 100*g* further has the high light-transmissive region 12 around the eyepoint 11, which is the center of the distance region 242*f*, and the lower side of the high light-transmissive region 12 is connected to a range including the center 11*a* of the near region 242*n* via the region 242*m*. The eyeglass lens 100*g* further has the low light-transmissive region 14 surrounding the circumference of the high light-transmissive region 12, and the low light-transmissive region 14 has the gradient region 16 where the coloring density (shading) gradually increases toward the periphery 15 of the eyeglass lens 100*g*. The shape of the high light-transmissive region 12 is not limited to the shape shown in the present example but may be a concentric shape centered around the eyepoint 11, which is the center of the distance region 242*f*, for example, concentrically circles or ellipses. In this case, the eyeglass lens 100*g* can be designed to hardly look like a progressive-power lens but designed to be an eyeglass lens having a donut-shaped pattern.

As described above, the invention is applicable to a progressive-power lens. In particular, sunlight and nighttime illumination tend to be blinding glare light 52 when the distance region 242*f* is used, but the eyeglass lens 100*g* can suppress the influence of the blinding glare light 52 and improve the discrimination ability in the daytime and nighttime. Further, the progressive-power eyeglass lens 100*g*, whose color or reflectance changes from the distance center (eyepoint) 11 of the lens toward the periphery, is of novel design and highly fashionable.

The invention has been described with reference to eyeglasses including a pair of eyeglass lenses, but the invention is not limited to a set of right and left binocular eyeglass lenses. The invention is also applicable to a monocular lens having a wide field of view, goggle-type having highly sealable lenses, and other variety of lenses. The invention is further applicable to sunglasses and goggles having no vision correction capability. Other types of eyeglass lens described above fall within the scope of the claims of the present application. Further, the eyeglass frame 9, to which the eyeglass lens 10 is attached, is not limited to a rimless frame but may be a rimmed frame.

The entire disclosure of Japanese Patent Application No: 2009-234079, filed Oct. 8, 2009 is expressly incorporated by reference herein.

What is claimed is:

1. A lens that covers the front side of an eye, the lens comprising:
a high light-transmissive region including an eyepoint; and
a low light-transmissive region surrounding the entire circumference of the high light-transmissive region, a light blocking ratio in the low light-transmissive region being higher than the light blocking ratio in the high light-transmissive region, wherein
the low light-transmissive region has a region where the light blocking ratio changes toward the periphery, and
the high light-transmissive region has a region where the viewing angle is at least 10 degrees and the total light blocking ratio ranges from 0 to 95%.

2. The lens according to claim 1, wherein the low light-transmissive region has a region where the light blocking ratio increases toward the periphery.

3. The lens according to claim 1, wherein the low light-transmissive region includes a first low light-transmissive region and a second low light-transmissive region surrounding the entire circumference of the first low light-transmissive region, the light blocking ratio in the second light-transmissive region being higher than the light blocking ratio in the first low light-transmissive region.

4. The lens according to claim 3, wherein the first low light-transmissive region has a region where the viewing angle is smaller than 30 degrees and the total light blocking ratio ranges from 0 to 95%.

5. The lens according to claim 1, wherein the low light-transmissive region has a region where the light blocking ratio for light having wavelengths ranging from 760 to 1300 nm is high.

6. The lens according to claim 1, wherein the low light-transmissive region has a region where the light blocking ratio for light having wavelengths ranging from 310 to 400 nm is high.

7. The lens according to claim 1, further comprising:
a distance region for viewing a relatively distant point;
a near region for viewing a relatively near point; and
a region which is located between the distance region and the near region and whose power continuously changes,
wherein the center of the distance region is the eyepoint.

8. The lens according to claim 1,
wherein the low light-transmissive region includes at least part of the lens and the part is colored.

9. The lens according to claim 1, further comprising:
a light control layer formed on one side of the lens, the light control layer changing the light blocking ratio in the high light-transmissive region and the light blocking ratio in the low light-transmissive region; and
a light blocking layer formed on the other side of the lens, the light blocking layer increasing the light blocking ratio in the low light-transmissive region relative to the light blocking ratio in the high light-transmissive region.

10. Eyeglasses comprising:
eyeglass lenses, each of which is the lens according to claim 1; and
an eyeglass frame to which the eyeglass lenses are attached.

11. A lens covers the front side of an eye, comprising:
a high light-transmissive region including an eyepoint; and
a low light-transmissive region surrounding the entire circumference of the high light-transmissive region, a light blocking ratio in the low light-transmissive region being higher than the light blocking ratio in the high light-transmissive region, wherein
the low light-transmissive region has a region where the light blocking ratio changes toward the periphery, and
the high light-transmissive region has a region where the viewing angle is smaller than 20 degrees and the total light blocking ratio ranges from 0 to 95%.

* * * * *